United States Patent
Sanders et al.

(10) Patent No.: US 7,213,211 B1
(45) Date of Patent: May 1, 2007

(54) SYSTEM FOR KNOWLEDGE TRANSFER IN A GROUP SETTING

(75) Inventors: Daniel P. Sanders, Indianapolis, IN (US); David Berque, Greencastle, IN (US)

(73) Assignee: Dynamic Knowledge Transfer, LLC, Indianapolis, IN (US)

( * ) Notice: Subject to any disclaimer, the term of this patent is extended or adjusted under 35 U.S.C. 154(b) by 156 days.

(21) Appl. No.: 10/689,804

(22) Filed: Oct. 20, 2003

Related U.S. Application Data

(63) Continuation-in-part of application No. 09/899,431, filed on Jul. 3, 2001.

(51) Int. Cl.
*G06F 3/00* (2006.01)
*G06F 3/01* (2006.01)

(52) U.S. Cl. .................. 715/753; 715/755; 715/759

(58) Field of Classification Search ............... 345/958; 709/204; 715/902, 753
See application file for complete search history.

(56) References Cited

U.S. PATENT DOCUMENTS

| | | |
|---|---|---|
| 4,616,336 A | 10/1986 | Robertson et al. |
| 4,716,404 A | 12/1987 | Tabata et al. |
| 5,107,443 A | 4/1992 | Smith et al. |
| 5,146,552 A | 9/1992 | Cassorla et al. |
| 5,176,520 A | 1/1993 | Hamilton |
| 5,211,564 A | 5/1993 | Martinez et al. |
| 5,231,578 A | 7/1993 | Levin et al. |
| 5,239,466 A | 8/1993 | Morgan et al. |
| 5,274,362 A | 12/1993 | Potvin |
| 5,309,555 A | 5/1994 | Atkins et al. |
| 5,353,398 A * | 10/1994 | Kitahara et al. ............ 715/759 |
| 5,524,240 A | 6/1996 | Barbara et al. |
| 5,692,141 A | 11/1997 | Kamisango et al. |
| 5,800,181 A | 9/1998 | Heinlein et al. |
| 5,809,240 A | 9/1998 | Kumagai |
| 5,816,820 A | 10/1998 | Heinz et al. |
| 5,823,788 A | 10/1998 | Lemelson et al. |
| 5,859,974 A * | 1/1999 | McArdle et al. ............ 709/204 |

(Continued)

OTHER PUBLICATIONS

Ishii et al., "Toward An Open Shared Workspace: Computer and Video Fusion Approach of Teamworkstation," *Communications of the ACM*, vol. 34, No. 12, Dec. 1991, pp. 37-50.

(Continued)

*Primary Examiner*—Ba Huynh
*Assistant Examiner*—Steven Theriault
(74) *Attorney, Agent, or Firm*—William F. Bahret

(57) ABSTRACT

A system for knowledge transfer in a group setting comprises a plurality of participant work areas and a moderator work area. Each of the plurality of participant work areas has at least one corresponding participant input-device, and each of the participant input-devices is adapted to define participant images that are then included on the corresponding participant work area. The moderator work area comprises at least one moderator input-device. The at least one moderator input-device is adapted to define moderator images that are then included on the moderator work area and to select moderator images that are then simultaneously included on each of plurality of participant work areas. The moderator input-device is further adapted to select participant images from any of the plurality of participant work areas that are then included on the moderator work area.

45 Claims, 11 Drawing Sheets

U.S. PATENT DOCUMENTS

| | | | |
|---|---|---|---|
| 5,872,924 A | 2/1999 | Nakayama et al. | |
| 5,903,252 A | 5/1999 | Ogata | |
| 5,996,002 A * | 11/1999 | Katsurabayashi et al. | ... 709/204 |
| 5,999,965 A | 12/1999 | Kelly | |
| 6,008,800 A | 12/1999 | Pryor | |
| 6,038,684 A | 3/2000 | Liddell et al. | |
| 6,078,920 A | 6/2000 | Tan et al. | |
| 6,081,829 A * | 6/2000 | Sidana | ........ 709/203 |
| 6,108,704 A | 8/2000 | Hutton et al. | |
| 6,131,121 A | 10/2000 | Mattaway et al. | |
| 6,141,000 A | 10/2000 | Martin | |
| 6,141,529 A | 10/2000 | Remschel | |
| 6,148,174 A | 11/2000 | Remschel | |
| 6,151,621 A | 11/2000 | Colyer et al. | |
| 6,154,631 A | 11/2000 | Remschel | |
| 6,160,987 A | 12/2000 | Ho et al. | |
| 6,185,184 B1 | 2/2001 | Mattaway et al. | |
| 6,230,171 B1 | 5/2001 | Pacifici et al. | |
| 6,275,490 B1 * | 8/2001 | Mattaway et al. | ......... 370/352 |
| 6,347,085 B2 | 2/2002 | Kelly | |
| 6,411,988 B1 | 6/2002 | Tafoya et al. | |
| 6,427,063 B1 * | 7/2002 | Cook et al. | ............ 434/350 |
| 6,434,604 B1 * | 8/2002 | Harada et al. | ............ 709/207 |
| 6,463,460 B1 * | 10/2002 | Simonoff | ............ 709/203 |
| 6,471,521 B1 * | 10/2002 | Dornbush et al. | ......... 434/322 |
| 6,551,357 B1 * | 4/2003 | Madduri | ............ 715/512 |
| 6,564,246 B1 | 5/2003 | Varma et al. | |
| 6,728,784 B1 * | 4/2004 | Mattaway | ............ 709/245 |
| 6,760,748 B1 * | 7/2004 | Hakim | ............ 709/204 |
| 6,766,356 B1 * | 7/2004 | Krautter | ............ 709/204 |
| 6,809,749 B1 * | 10/2004 | Chen et al. | ............ 715/753 |
| 6,826,595 B1 * | 11/2004 | Barbash et al. | ............ 709/204 |
| 6,859,909 B1 * | 2/2005 | Lerner et al. | ............ 715/512 |
| 6,871,318 B1 * | 3/2005 | Wynblatt et al. | ........ 715/500.1 |
| 6,988,138 B1 * | 1/2006 | Alcorn et al. | ............ 709/225 |
| 2002/0101445 A1 | 8/2002 | Berque | |
| 2002/0115050 A1 * | 8/2002 | Roschelle et al. | ......... 434/350 |
| 2002/0182571 A1 * | 12/2002 | McCormick et al. | ....... 434/157 |

OTHER PUBLICATIONS

D. Berque, "Electronic Blackboards: A Vision of the Future," *The Tenth International Conference on Technology and Education*, Massachusetts Institute of Technology, Mar. 21-24, 1993, pp. 340-342.

D. Berque et al., "On the Progress of Developing Groupware to Support Notetaking," *Second Annual International Conference on the Learning Sciences*, Northwestern University, Evanston, Illinois, Jul. 25-27, 1996, pp. 345-350.

J. Fekete et al., "Using the Multi-Layer Model for Building Interactive Graphical Applications," *9th Annual Symposium for User Interface Software and Technology*, Seattle, Washington, Nov. 6-8, 1996, pp. 109-118.

D. Berque et al., "Electronic Classrooms: A Prototype Using Laser Whiteboards and Pen Based Computers," *The Fourteenth International Conference on Technology and Education*, Oslo, Norway, Proceedings vol. 1, Aug. 10-13, 1997, pp. 231-233.

J. Fekete et al., "Using the Multi-Layer Model for Building Interactive Graphical Applications," *9th Annual Symposium for User Interface Software and Technology*, Seattle, Washington, Nov. 6-8, 1996, pp. 109-118.

Press release, "DePauw University's DEBBIE Project Enhances Collaborative Interactive Education in the Classroom," Wacom Technology Corp., c. Jan. 2000 (5 pages).

D. Berque et al., "The Design of an Interface for Student Note Annotation in a Networked Electronic Classroom," *Journal of Network and Computer Applications*, vol. 23, No. 2, Apr. 2000, pp. 77-91.

L. Anderson, "'Noteless' Classroom of the Future Technology Makes Teaching and Learning More Personal," *DePauw Magazine* [online], Spring 2000 (4 pages) [retrieved Dec. 21, 2000]. Retrieved from the Internet: <http://www.depauw.edu/pa/magazine/spring2000/news/debbie.asp>.

D. Berque et al., "Teaching Theory of Computation Using Pen-Based Computers and an Electronic Whiteboard," *Proceedings of ITiCSE 2001, 6th Annual Conference on Innovation and Technology in Computer Science Education*, Canterbury, England, Jun. 25-27, 2001, pp. 169-172.

D. Berque et al., "Changing Places: A Case Study in Adapting an Education Pen-based System for use at a Distance," *World Conference on Educational Multimedia, Hypermedia and Telecommunications*, Denver, Colorado, Jun. 24-29, 2002 (6 pages).

Streitz, Norbert et al., "DOLPHIN: Integrated meeting support across local and remote desktop environments and liveboards," 1994, ACM 0-89791-698-1/94/0010 pp. 345-358.

Abowd, Gregory et al., "Teaching and learning as multimedia authoring: The classroom 2000 project," 1996, ACM 0-89791-871-1/96/11 pp. 198-198.

Abowd, Gregory et al., "Classroom 2000: A system for capturing and accessing multimedia classroom experiences," 1998, ACM 0-1-58113-028-7 pp. 20-21.

* cited by examiner

SYSTEM FOR KNOWLEDGE TRANSFER IN A GROUP SETTING

CROSS-REFERENCE TO RELATED APPLICATION

This application is a continuation-in-part of patent application Ser. No. 09/899,431, filed Jul. 3, 2001, which application is hereby incorporated by reference.

BACKGROUND

Software that supports cooperative work, often called groupware, generally employs work surfaces that function according to the "What you see is what I see" ("WYSIWIS") paradigm. This means that whenever a group of users is using such software, each has the same view. Anything written by one of the users is immediately seen by everyone else. Although the WYSIWIS paradigm has been the central idea behind most shared work surface groupware, deviations from a strict interpretation of some aspects of this paradigm have sometimes been considered.

For example, users may be distracted by a strict adherence to the WYSIWIS "simultaneity constraint." Consider a group member who is drawing a rectangle on the shared work surface. The other group members may find it distracting to watch the fine grain updates that transpire as the rectangle is sized and placed. Therefore, it may be more appropriate for the system to delay the process of updating the other displays until the size and placement of the rectangle have been finalized, even though this implies the users will not always have identical views of the shared work surface.

Another example of an advantageous relaxing of strict adherence to the WYSIWIS paradigm is permitting the shared work surface to exceed the size of what can be displayed at one time, and permitting individual users to select which portion is displayed at their workstation.

In many situations the members of a group employing a groupware system do not all have a common role. For example, one valuable use of groupware is as a teaching aid in a classroom. In this situation, a teacher or professor has the primary responsibility for selecting the subject matter and directing the discussion. It is therefore advantageous for this person to have additional means of reviewing and selecting the contributions from the other group members for the purpose of providing those that are likely to be most helpful to the discourse.

What is needed, therefore, is a system for sharing knowledge that uses a relaxed version of the WYSIWIS paradigm to further facilitate the efficient transfer of useful information, while filtering out information that is not useful or distracting. The present invention is directed towards meeting this need.

SUMMARY OF THE INVENTION

In a first embodiment a system for transferring knowledge between a plurality of users with a shared drawing surface according to the present invention comprises a plurality of work areas, each comprising a main layer, a background layer, a participant layer, and a moderator layer.

In a second embodiment, a network of computers programmed for knowledge transfer in a group setting according to the present invention comprises a server, a plurality of workstations, and a moderator workstation. The server comprises a database. Each of the plurality of participant workstations is programmed to provide a participant work area, and has at least one corresponding participant input-device. Each of the participant input-devices is adapted to create data structures defining participant images that are then included the participant work area. The moderator workstation is programmed to provide a moderator work area, and comprises at least one moderator input-device. The at least one moderator input-device is adapted to create data structures defining moderator images that are then included in the moderator work area, and to select moderator images that are then simultaneously included on each of plurality of participant work areas. The data structures are stored in the database, and the moderator input-device is further adapted to select participant images from any of the plurality of participant work areas that are then included on the moderator work area.

In a third embodiment, a network of computers programmed for knowledge transfer in a group setting according to the present invention comprises a server, a plurality of participant workstations, and a moderator workstation. The server comprises a database. Each of the plurality of participant workstations is programmed to provide a participant work area and has at least one corresponding participant input-device. Each of the participant input-devices is adapted to create data structures defining participant images that are then included on the participant work area. The moderator workstation is programmed to provide a moderator work area and comprises at least one moderator input-device. The at least one moderator input-device is adapted to create data structures defining moderator images that are then included on the moderator work area, and to select moderator images that are then simultaneously included on each of plurality of participant work areas. The data structures are stored in the database. The moderator work area comprises a moderator public scroll and a moderator private scroll. Each participant work area comprises a participant public scroll and a participant private scroll. Each participant workstation displays images placed on the participant's public scroll by the moderator superimposed on images placed on the participant's public scroll by the participant. The moderator input-device is further adapted to select participant images from any of the plurality of participant work areas that are then included on the moderator work area.

In a fourth embodiment, a network of computers programmed for knowledge transfer in a group setting according to the present invention comprises a plurality of participant workstations and a moderator workstation. Each of the participant workstations is programmed to provide a participant work area, and has at least one corresponding participant input-device. Each of the participant input-devices is adapted to create data structures defining participant images that are then included on the participant work area. The moderator workstation is programmed to provide a moderator work area. The moderator workstation comprises at least one moderator input-device, the at least one moderator input-device being adapted to create data structures defining moderator images that are then included on the moderator work area, and to select moderator images that are then simultaneously included on each of plurality of participant work areas. The moderator work area comprises a main layer, a moderator layer, a participant layer, and a background layer. Each participant work station comprises a participant's virtual drawing surface. The virtual drawing surface comprises a main layer, a participant layer, a moderator layer common to the moderator's work area, and a background layer common to the moderator's work area.

The moderator input-device is further adapted to select participant layers from any of the plurality of participant work areas that are then placed on the moderator's participant layer. The network can be used in a group mode and a standalone mode. The workstations are located such that a first user positioned to use a workstation and a second user positioned to use a different workstation can hear each other speak.

In a fifth embodiment, a network of computers programmed for knowledge transfer in a group setting according to the present invention comprises a server, a plurality of workstations, and a moderator workstation. The server comprises a database. Each of the plurality of participant workstations is programmed to provide a participant work area, and has at least one corresponding participant input-device. Each of the participant input-devices is adapted to create data structures defining participant images that are then included on the participant work area. The moderator workstation is programmed to provide a moderator work area and comprises at least one moderator input-device adapted to create data structures defining moderator images that are then included on the moderator work area, and to select moderator images that are then simultaneously included on each of the plurality of participant work areas. The moderator work area comprises a main layer, a moderator layer, a participant layer, and a background layer. Each participant work area comprises a main layer, a participant layer, a moderator layer common to the moderator work area, and a background layer common to the moderator work area. The moderator input-device is further adapted to select participant layers from any of the participant workstations that are then copied to the moderator's participant layer. The network can be used in a group mode and a standalone mode. Every user positioned to use a workstation can hear every other user positioned to use any other workstation. Data structures defining the images are stored in the database.

In a sixth embodiment, a network of computers programmed for knowledge transfer in a group setting according to the present invention comprises a server, a plurality of participant workstations, a moderator workstation, and collision correction functionality. The server comprises a database. Each of the participant workstations is programmed to provide a participant work area, and has at least one corresponding participant input-device. Each of the participant input-devices is adapted to create data structures defining participant images that are then included on the participant work area. The moderator workstation is programmed to provide a moderator work area, and comprises at least one moderator input-device. The at least one moderator input-device is adapted to create data structures defining moderator images that are then included on the moderator work area, and to select moderator images that are then simultaneously included on each of the plurality of participant work areas. The data structures are stored in the database. The moderator work area comprises a main layer, a moderator layer, a participant layer, and a background layer. Each participant work area comprises a main layer, a participant layer, a moderator layer common to the moderator work area, and a background layer common to the moderator work area. The moderator input-device is further adapted to select participant layers from any of the plurality of participant work areas that are then copied to the participant layer on the moderator's virtual drawing surface. A participant layer may only be selected to be copied to the participant layer on the moderator's virtual drawing surface after an instruction has been given at the participant workstation upon which the participant layer resides. The network can be used in a group mode and a standalone mode. Every user positioned to use a workstation can hear every other user positioned to use any other workstation.

In a seventh embodiment, a system for knowledge transfer in a group setting according to the present invention comprises a server, a plurality of participant workstations, and a moderator work station. The server comprises a database. Each of the participant work stations comprises at least one participant display device, at least one input device, and a participant virtual drawing surface. The participant virtual drawing surface comprises a main layer, a moderator layer, a participant layer, and a background layer. The at least one participant input device is adapted to permit the participant to create data structures defining images that are organized into the participant layer and displayed on the at least one participant display device. The moderator work station, comprises at least one moderator display device, at least one moderator input-device, and a moderator virtual drawing surface. The moderator virtual drawing surface comprises a main layer, a moderator layer, a participant layer, and a background layer. The at least one moderator input device is adapted to create data structures that are organized into the moderator layer and that define images that are displayed on the at least one moderator display device and on each of the at least one participant display devices. The data structures are stored in the database.

DETAILED DESCRIPTION OF THE PREFERRED EMBODIMENT

Figure 1:
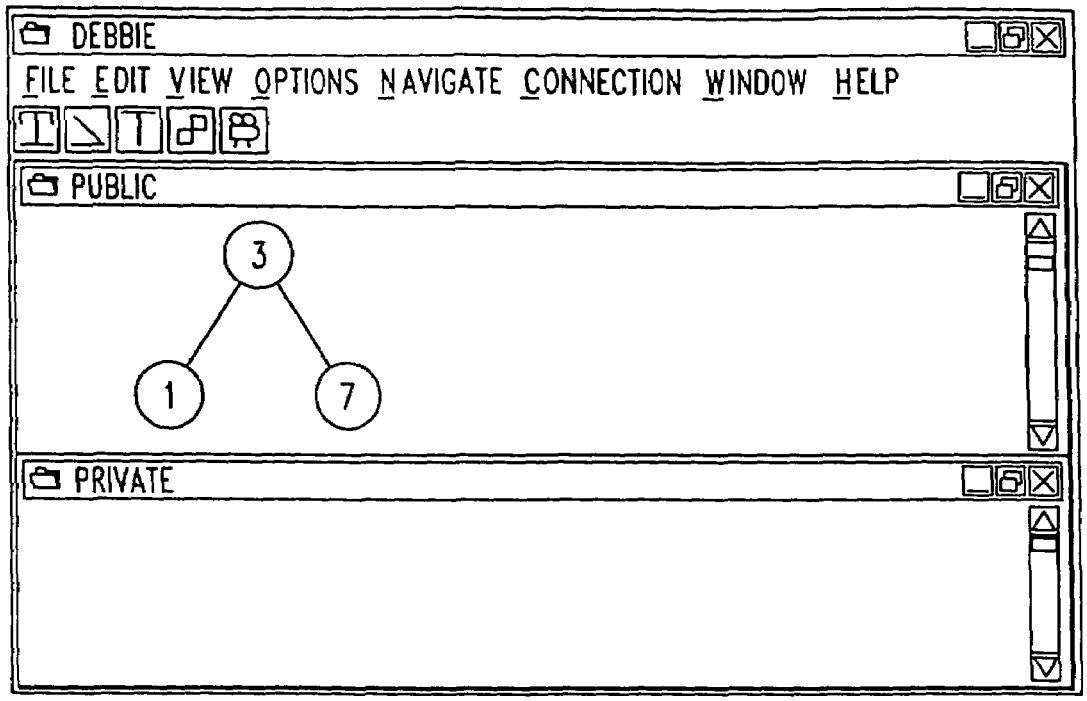
FIG. 1 is an example of an image of a binary search tree that has been placed on a shared work area.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A preferred embodiment system of knowledge transfer in a group setting according to the present invention employs a What-You-See-Is-What-I-See-One-Way ("WYSI-WISOW") paradigm. The WYSIWISOW paradigm is characterized by inclusion of a moderator workstation and participant workstations in a shared work surface system. The moderator workstation makes available to a user, called the moderator, additional functionality that is not available through the participant workstations to their users, known as participants.

Figure 3:
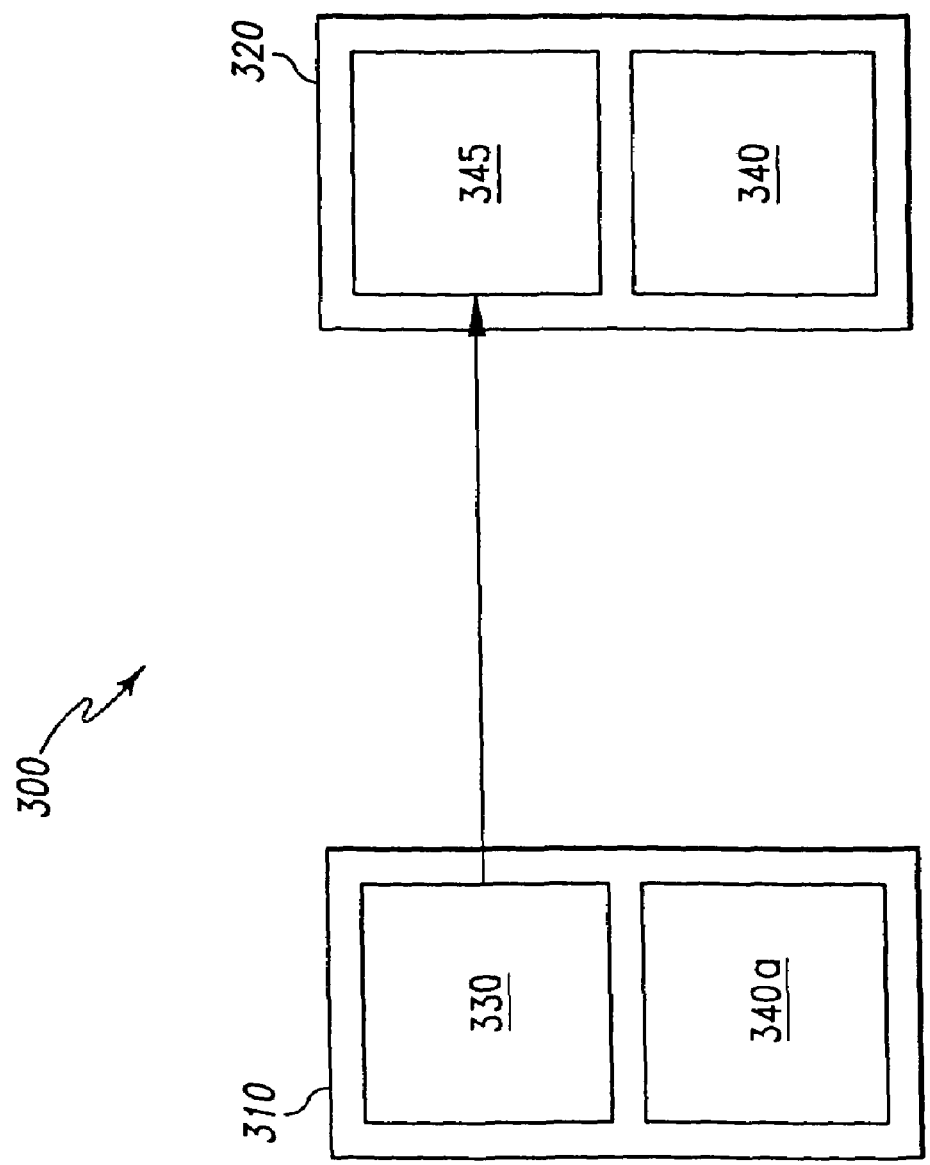
FIG. 3 is a diagram of certain elements of a group work area according to the present invention.

The preferred embodiment system comprises a group work area. FIG. 3 illustrates the relationship between certain elements of the group work area of the presently preferred embodiment, shown generally at 300. The group work area 300 comprises at least one moderator work area 310 and at least one participant work area 320, and a shared work area 330 and a plurality of private work areas 340, one corresponding to each workstation-including one moderator private work area 340a. The moderator adds images to the group work area 300 by adding them to the moderator work area 310, while participants add images to the group work area 300 by adding them to their participant work area 320.

In the preferred embodiment, the moderator work area 310 comprises a shared work area 330 and a moderator private work area 340a. Similarly, in the preferred embodiment, each participant work area 320 comprises a participant public work area 345 and a participant private work area 340. When the moderator adds images to the shared work area 330, they are simultaneously displayed at each participant's workstation (and the moderator work station). When the moderator places images on the moderator private work area 340a, they are displayed at the moderator workstation, but they are not generally displayed at any participant's workstation. In certain alternative embodiments, the moderator work area 310 does not include a moderator private work area 340a.

When a participant adds images to the group work area 300, they are added either to that participant's public work area 345 or that participant's private work area 340. Images placed on a participant's public work area 345 are typically displayed superimposed on images on the shared work area 330, while images placed on a participant's private work area are generally not. (In some situations it may make a difference what order such objects are "stacked" in—e.g., when the images involve different colors. "Superimposed," in this context, is not meant to indicate which image is placed "on top" of which. In certain embodiments, the images on the participant public work area 345 are always placed "on top" of those on the shared work area 330, while in others the opposite is true. In certain other embodiments, the images on the shared work area 330 and participant public work area 345 are always "stacked" in the order in which they are created. In still other embodiments, the order in which these images are "stacked," can vary, for example at the selection of the participant.) The images on each participant work area 320 are typically initially displayed only at that participant's workstation. In certain embodiments, the moderator may, however, view any of the participant work areas 320, including private work areas 340, at the moderator workstation, and may select images from a participant work area 320 to be included in the shared work area 330, thereby causing them to be displayed at each workstation.

A preferred embodiment system according to the present invention can be used in group mode or standalone mode. Typically, the system is used in group mode to initially aid in the transfer of information between users. Standalone mode can be used during follow up activities in which, for example, the moderator may check work that was produced while the system was used in group mode. During group use, images are placed on the group work area 300. The group work area 300 can be reviewed by individual users later, in standalone mode, in order to aid in retention and understanding of the information transferred. Standalone mode can also be used prior to a group use session, for example to prepare images for placement on the public scroll.

When used in group mode, the group typically discusses a subject, in order for the moderator to provide information to the participants about that subject. The moderator typically augments verbal statements by placing images on the shared work area 330 which he or she expects to aid the participants in more fully understanding those statements. For example, if the subject being discussed is chemistry, the images might include chemical symbols or equations. For another example, if the subject being discussed is the Pythagorean Theorem, the moderator might provide a diagram of a right triangle. The participants can supplement the images provided by the moderator with images that the participant believes might be helpful for remembering the relevance of the images selected by the moderator. For example, a participant might add a caption labeling one side of the right triangle "hypotenuse." This caption would become part of that participant's surface 320, and would generally be displayed only at that participant's workstation. Note that the group work area 300 can be used in environments where the workstations are located such that the users can speak directly to one another—for example, in a classroom—or in environments where some means of transmitting audio are necessary—such as a virtual classroom, in which various users are located remotely, and are connected via the Internet. The group work area 300 can also be used in environments in which the users cannot hear each other at all, such as when, for example, the users rely completely on the group work area 300 for the transmission of information during the group mode session.

It will be appreciated by those skilled in the art that, because the moderator does not normally see images placed on a participants' surface 320, it is possible that the moderator will subsequently place an image on the shared work area 330 which is superimposed on one or more images that participants have placed on their participant public work area 345. This problem is known as "collision." There are two general strategies for coping with collision: collision correction and collision avoidance.

Collision correction functions to permit users to work around the collisions that occur. For example, in certain alternative embodiments each workstation includes functionality that permits toggling between three view modes: one in which only the shared work area 330 is displayed, one in which only the participant public work area 345 is shown, and one in which both are superimposed. In these embodiments, although the last of these modes might include collisions, by toggling between the other two, a participant can view any image on either their public work area 345 or the shared work area 330 without the collisions.

Another collision correction strategy involves including functionality at each workstation that permits the participants to relocate images on the participant work area 320 that have become involved in collisions. In certain embodiments, the colliding images are relocated automatically when a collision occurs.

Collision avoidance, on the other hand, functions to reduce or eliminate the probability of collisions occurring in the first place. For example, in certain embodiments a participant's public work area 345 includes an area (such as a margin or window) that does not have a corresponding location on the shared work area 330. Thus, a participant can add images to this area and be assured that no collisions will occur.

In the presently preferred embodiment, participant workstations include functionality that permits the participant to place footnote images on the public scroll 345 and private scroll 340. These footnote images provide a link between images on a participant's public work area 345 or the shared work area 330, and the private scroll 340, and vice versa. Preferably, these footnote images can also provide a link between images on a participant's public work area 345 or the shared work area 330 and some other virtual location. For example, such a footnote image might provide a link to a computer file, or to a URL for a website containing information the participant believes relevant. Preferably, participants can also add images to their private scroll 340 without regard to the danger of future collisions. Thus, a participant can, for example, place smaller annotations directly on their public work area 345, while placing larger annotations, with their correspondingly larger danger of generating future collisions, in a footnote. In the presently preferred embodiment, the footnote images include means to display the corresponding images. For example, if the corresponding images are located in the participant's private work area 340, the footnote image preferably includes functionality to cause the participant's workstation to display the portion of the private work area 340 containing those images.

Figure 2:
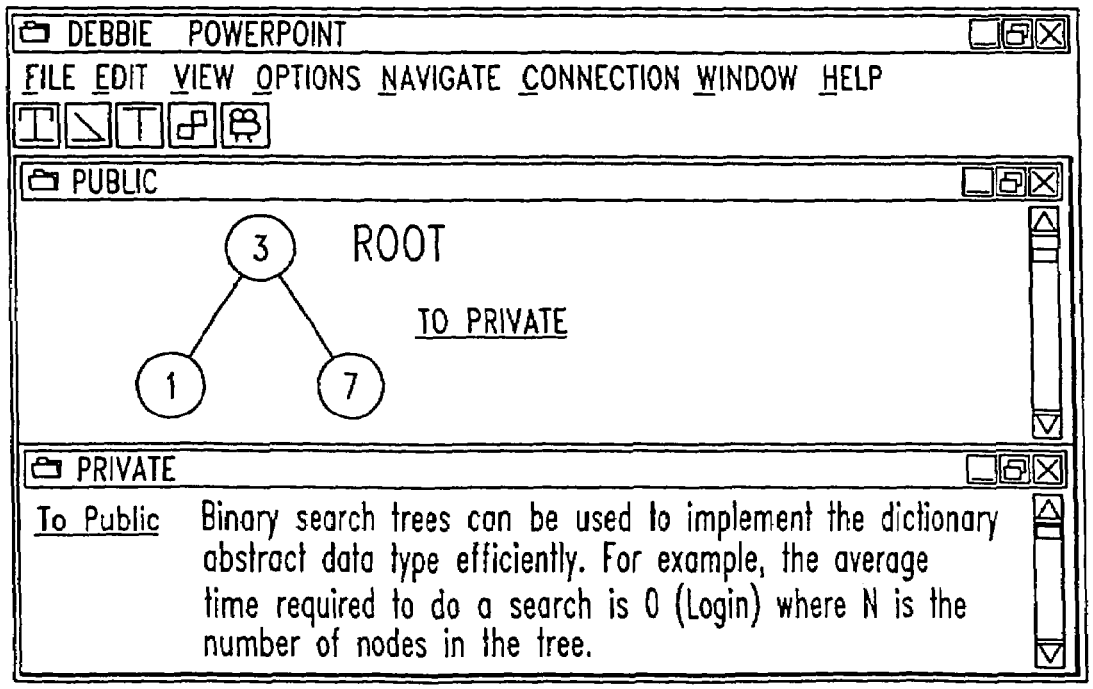
FIG. 2 is an example of the image of FIG. 1, superimposed with images placed on a participant public work area, including a footnote image having a corresponding text image on the participant's private work area.

Thus, the presently preferred embodiment group work area 300 could be used to aid in teaching the participants, for example, about binary search trees. The moderator might select a place on the shared work area 330, and draw an image of a binary search tree, as shown in FIG. 1, thereby placing the image shown in FIG. 1 on the shared work area 330, and causing it to be displayed on each of the participant workstations. The moderator might state orally that the part of the tree containing the circled "3" is called the root, as a part of a lengthier oral description of the properties of binary search trees generally. A participant might place an annotation saying "root" in his or her participant public work area 345, to identify that portion of the binary search tree. The participant might also type a lengthier annotation on their private work area 340, with footnote symbols saying "To Private" and "To Public" and comprising hypertext links such that "clicking" on one of them (either with the drawing pad, a mouse, or some other appropriate input device) in one window causes the other window to center on the other footnote symbol. FIG. 2 illustrates what this might look like on the display device of the participant's workstation. Those skilled in the art of computer operation will recognize the "scroll bars" that provide graphical information indicating how to scroll these scrolls up and down. Note that either window could be independently scrolled to review images above or below the ones shown here.

In the presently preferred embodiment, each of the workstations is a complete and independent computer workstation sharing a network connection to each of the other workstations. Thus, in the presently preferred embodiment, each workstation includes its own processor, monitor, storage media, memory, etc. In certain embodiments, the workstations transfer information via a dynamic TCP/IP protocol, so that no shared storage is needed. Those skilled in the art will appreciate that the system need not use TCP/IP, and that any suitable protocol may be used to transmit information from workstation to workstation. In certain alternative embodiments, in order to reduce the cost of the workstations, some or all of them may include fewer than all of these features. For example, in certain embodiments, the participant workstations include a processor and monitor, but no memory or storage media. These assets are preferably located elsewhere in the network, such that the workstations can use them.

Figure 8:
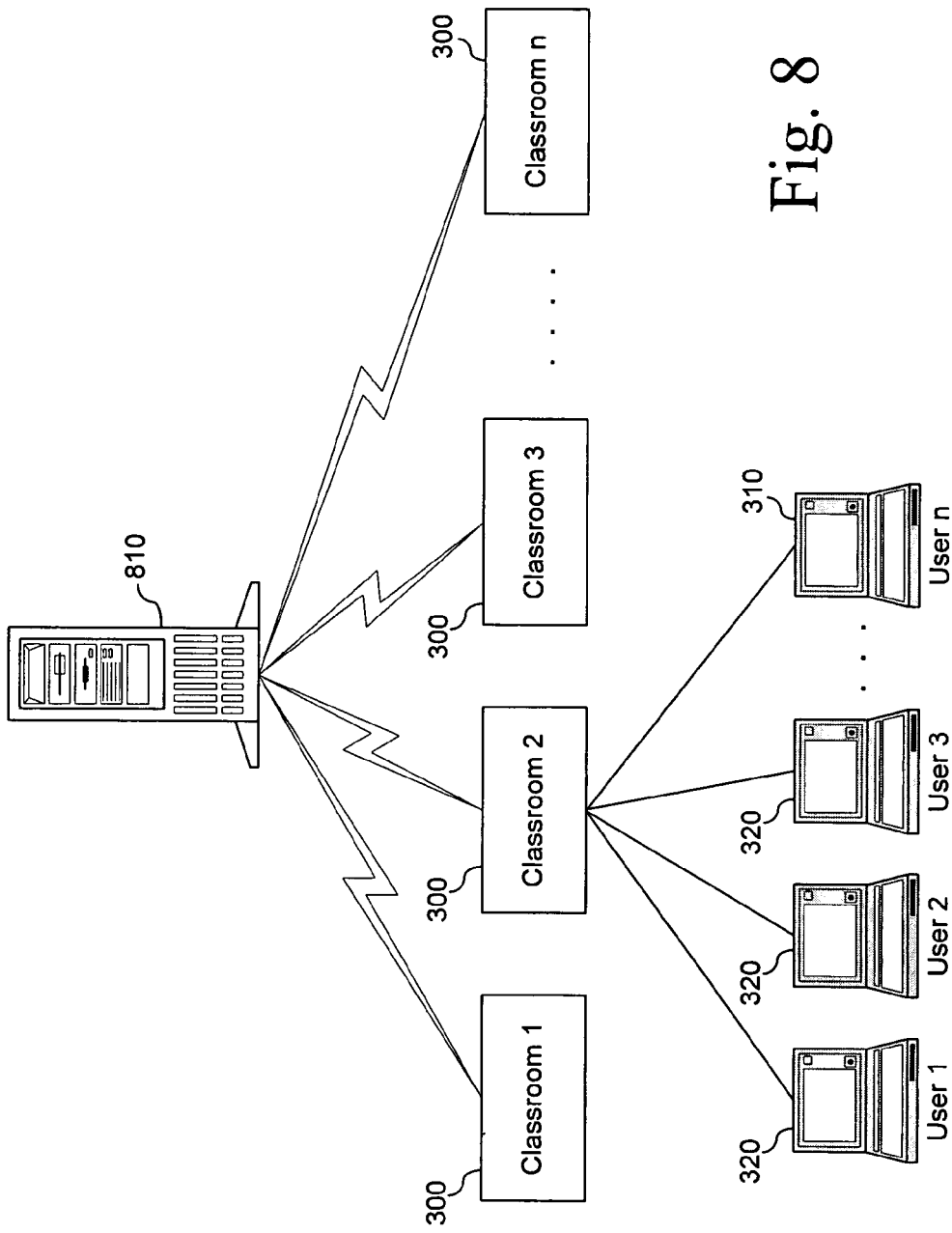
FIG. 8 is an illustration of a server architecture suitable for use in simultaneously operating multiple work areas according to the present invention.

In the presently preferred embodiment, the system is implemented as a computer network, such as a local area network ("LAN"), having a dedicated server and a plurality of client workstations, as is known in the art. Using a client/server architecture, multiple group work areas 300 (each comprising a plurality of user work areas 320 and 310) can be operated from a shared server 810, as shown in FIG. 8. This would facilitate, for example, employing separate group work areas 300 for a number of different classrooms being taught simultaneously. Additionally, it will be appreciated that using a client/server architecture facilitates certain security and resource management functions, such as gate-keeping functions (e.g. individual user accounts and passwords).

Figure 5:
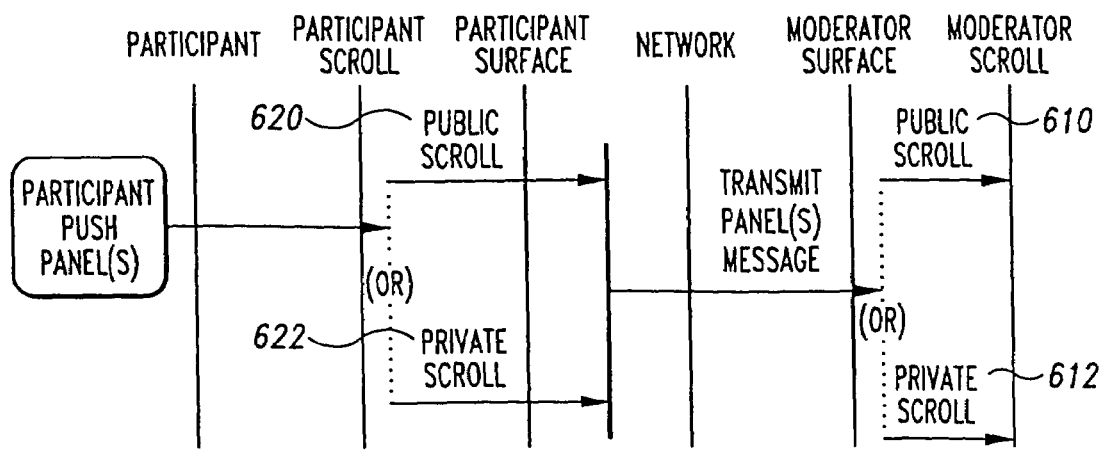
Figure 6:
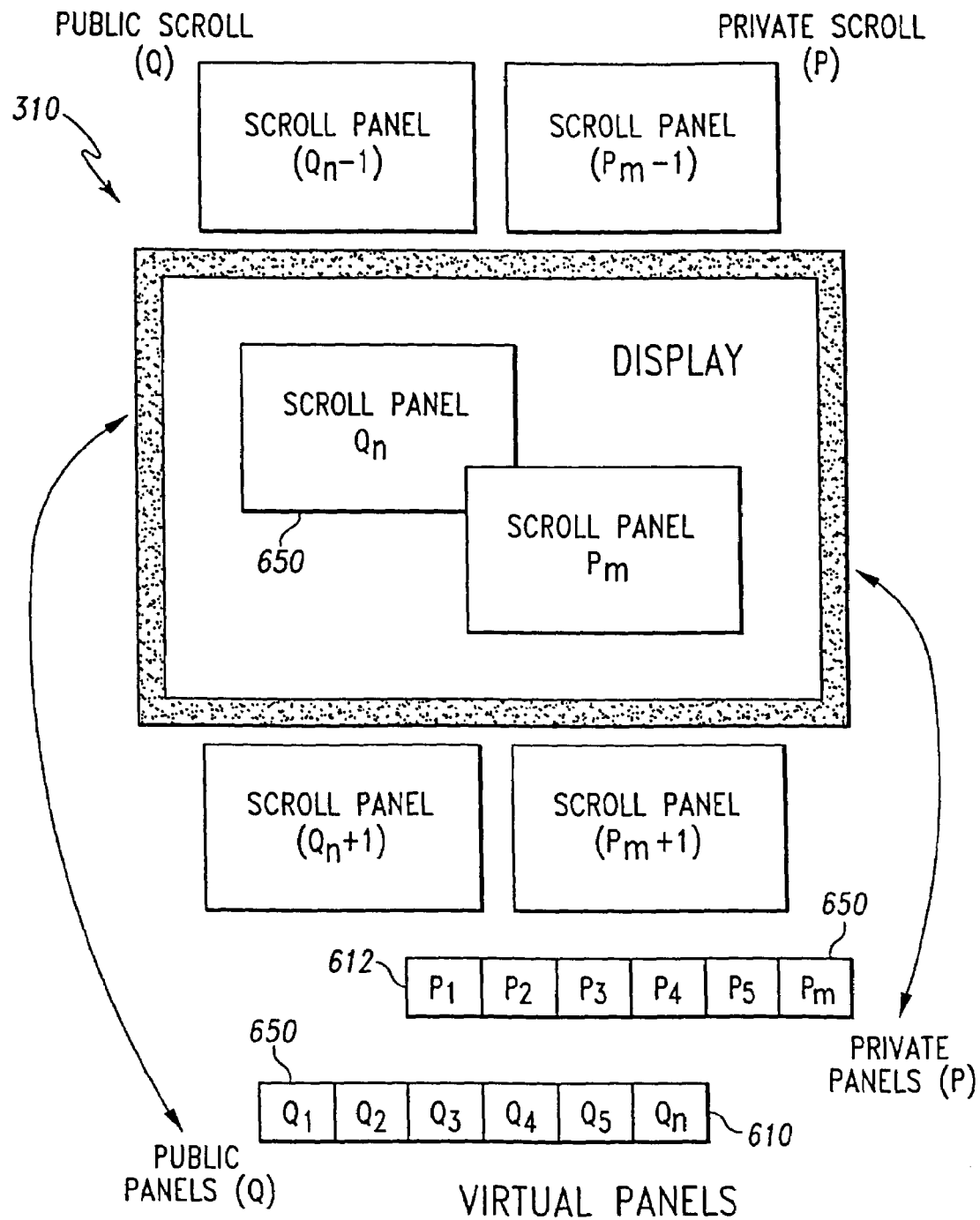
FIG. 6 is a diagram of certain elements of a preferred embodiment user work area according to the present invention.

Preferably, the moderator work area 310 and each of the participant work areas 320 are each implemented as at least one scroll, each scroll comprising a set of practically infinitely scrollable panels. In the presently preferred embodiment, for example, the moderator work area 310 comprises a moderator public scroll 610 and a moderator private scroll 612, each having one or more panels 650 as shown in FIG. 6. Likewise, each participant work area 320 comprises a participant public scroll 620 and a participant private scroll 622, described herein with reference to FIG. 5, each scroll having a number of panels. (In those embodiments lacking a moderator private work area 340a, the moderator private scroll 612 is excluded.) Preferably, each of the scrolls is made up of one or more panels 650 in series, similar to a slide-show. However, unlike a slide show, preferably, portions of more than one panel 650 can be displayed at a time, so that an image can be placed straddling two panels 650 and still have each portion displayed simultaneously. "Scrollable," in this context, means that the panels 650 can be larger than what can be displayed on the display device, but that the portion that is being displayed can be "scrolled" by means of a scroll bar or other appropriate mechanism, such as would occur to a person of ordinary skill in the art of computer use. "Practically infinite," in this context, means limited by the ability of volatile memory to contain the entire scroll. In certain embodiments, the panels 650 can scroll vertically or horizontally. In certain embodiments, the panels can scroll both vertically and horizontally. In certain alternative embodiments, the panel's length is limited by persistent memory, such that portions of the panel are swapped between volatile and persistent memory as necessary when the size of the panel exceeds what can be stored in volatile memory alone. Preferably, the panels have a variable size. Thus, in order to conserve space, a panel preferably is created with some relatively small size. If additional space is needed in order to accommodate larger images, the panel's size can be increased. Thus, in the preferred embodiment, the user defines the actual size of each panel. Preferably, such additional panel size can be added even after additional panels have been added to the scroll.

In the presently preferred embodiment, each panel 650 comprises a linked-list of objects that have been added to it. Each workstation can "play back" the evolution of the panel by adding these objects, one at a time, to the display, in the order they were originally added. It will be appreciated that this means that each object generally occupies only a single panel 650. Thus, while an image can straddle two panels 650, it will generally be comprised of objects that do not. It will also be appreciated that other data structures can also be used to store information corresponding to images in panels 650. For example, the workstations need not use an object-oriented database structure. Panels 650 could be stored in a relational database. For another example, the workstations need not even store the objects in an internal data structure. In the presently preferred embodiment, the footnote objects comprise hyperlinks that cause the corresponding annotations to be displayed when activated, for example by clicking on them with a mouse.

In the presently preferred embodiment, the moderator adds an image to the shared work area 330 by adding an object corresponding to it to the moderator public scroll 610. Information is then sent to each participant workstation causing that object to be added to each of the participant's public scrolls 620. The moderator places images on the moderator private work area 340*a* by adding an object corresponding to it to the moderator private scroll 612. Likewise, a participant adds images to the participant's public work area 345 or the participant's private work area 340 by adding an object corresponding to it to the participant's public scroll 620 or the participant's private scroll 622, respectively. Thus, in the preferred embodiment, images on the participant's public work area 345 are "stacked" in chronological order, without regard to who placed them there.

In certain embodiments, the moderator workstation includes an electronic whiteboard upon which the moderator can draw directly, for example, using a finger, to generate objects that are placed on the moderator's public scroll 610 or private scroll 612. In those embodiments in which at least some of the participant workstations are proximally located, the whiteboard can be oriented to permit participants to observe while images are drawn on it. In this way, participants can receive information from non-verbal cues, such as gestures the moderator makes in relation to the images on the whiteboard. Preferably, the whiteboard can also be oriented so that the participants cannot see it, so that the moderator can prepare a complete image that can be presented to the participants as a finished product. In certain embodiments, the participant workstations are located remotely, so that participants could not see a whiteboard. In such embodiments, the whiteboard can be omitted.

In certain embodiments, multiple whiteboards are included, including a moderator whiteboard and whiteboards for one or more participant workstations. In these embodiments images can be stacked in chronological order in the work areas as described hereinabove with respect to other input devices.

In the presently preferred embodiment, the participant workstations include a pen-based video tablet, which permits the participants to place objects on the participant's public scroll 620 or private scroll 622. Preferably, the moderator workstation also includes a pen-based video tablet. Preferably, each workstation also includes a keyboard for entering text objects. Other input devices, such as mice, optical scanners, etc., can also be advantageously included at one or more of the workstations. In those embodiments in which the moderator work area 310 includes a moderator private scroll 612, the moderator workstation advantageously includes at least two monitors—one for displaying the private work area 340*a*, and one for displaying the shared work area 330.

The combination of a display device and a drawing input device (such as a whiteboard or pen-based video tablet) is sometimes referred to as a drawing surface. The user can create an image on the group work area 300 by drawing on the input device, which then creates a data structure defining the image. The data structure is placed on the appropriate scroll, and the image is displayed on the display device. Of course, other types of images, including graphic images stored in a graphics file, can be placed on the group work area 300, displayed on the display devices, and combined with drawn images. Thus, for example, a digital photograph could be displayed, and some relevant feature highlighted by drawing a circle or an arrow on the drawing surface.

Figure 4:
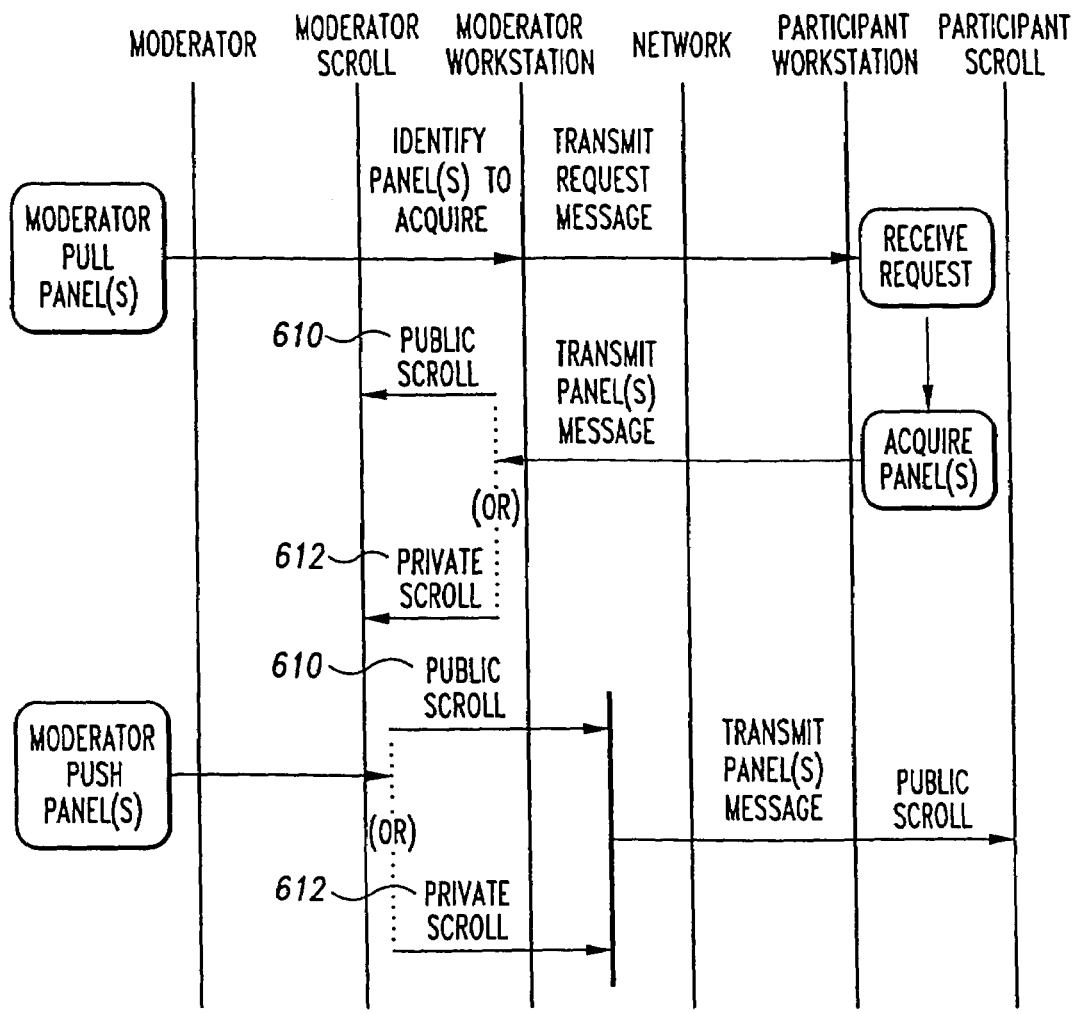
FIGS. 4 and 5 are diagrams showing certain dynamic sharing methods of a group work area according to the present invention.

In certain embodiments a system according to the present invention can use dynamic or static sharing methods to transfer information between workstations. As discussed above, in certain embodiments the system uses TCP/IP to permit dynamic sharing methods. FIGS. 4 and 5 illustrate three such dynamic sharing methods. For example, as shown in FIG. 4, the moderator can select a panel from either the moderator's public scroll 610 or the moderator's private scroll 612 to be sent or "pushed" to a participant's workstation. For another example, as shown in FIG. 4, a moderator might pull a panel from a participant's public scroll 620 or private scroll 622 by selecting the panel to pull. A message is sent to the participant's workstation, which then sends the panel back to the moderator workstation without participant interaction. The returned panel can be placed on the moderator's public scroll 610 or the moderator's private scroll 612, at the moderator's discretion.

FIG. 5 illustrates a kind of dynamic sharing in which the participant pushes a panel either from the participant's public scroll 620 or private scroll 622, which is then placed on the moderator's public scroll 610 or private scroll 612, at the moderator's discretion.

Using these methods, a moderator might place a question on a panel 650 of the moderator's public scroll 610, and request that a participant pass a panel 650 with the answer from their private scroll 620 to the moderator workstation. Alternatively, the moderator might actively select a participant's answered panel 650 and pull the panel 650 without participant interaction. Or, the moderator could pose a question on the moderator's public scroll 610, and then "collect" the answers. The answers could be collected by copying the panels 650 directly to the moderator's public scroll 610, or by copying the panels 650 to the moderator's private scroll 612, where they can be reviewed before pasting selected answers into the moderator's public scroll 610 and sharing them with the group.

In certain embodiments panels that are passed between users are tracked, in order to permit return sending. It will be appreciated that this can be effected, for example, by associating passed panels with a user identification. (The user identification can advantageously be a user account name, for example in those embodiments employing a server/client architecture.) By including with passed panels information about their origin the moderator can, for example, place annotations on the individual passed panels, and then return them all to the participants who generated them. Note that this entire process can be performed anonymously, permitting, for example, blind grading and feedback.

A system according to the present invention advantageously can also use static sharing methods. For example, one or more scroll panels 650 can be exported and written to a panel file. A user can export panels 650 from either their public scroll 610 or 620, or their private scroll 340, to a panel file. The resulting electronic files can be copied, deleted, or imported into another session. When imported into another session, the panel file can be placed by a participant on their private scroll 622 or their public scroll 620, or by the moderator either on the moderators public scroll 610 (and, consequently, each participant's public scroll 620) or the moderators private scroll 612. Panel files can also be transferred to other users, for use in the same or other sessions.

Thus, a user can save information, in the form of files, corresponding to images on their work area 310 or 320. The resulting information can be imported in another session. A participant can place these images on their public work area 345 or their private work area 340, while the moderator can place these images on the shared work area 330 or the moderator private work area 340a.

In these embodiments preferably entire sessions, or portions of sessions, can be saved in a notebook file. This permits a session to be interrupted, and later resumed. The scrolls of a single user's work area form a chapter in the notebook file. Thus, for example, a participant could save only the their own work area to a notebook file having only a single chapter. Or, for example, the moderator could save the entire group work area 300 in a notebook file having one chapter for each user that was involved in the session. Notebook files can be opened, closed, copied, or deleted. Two notebook files can be merged into a single notebook file. Notebook files can be transferred between users. The electronic size of a notebook is typically limited only by storage space on persistent memory media.

Figure 7:
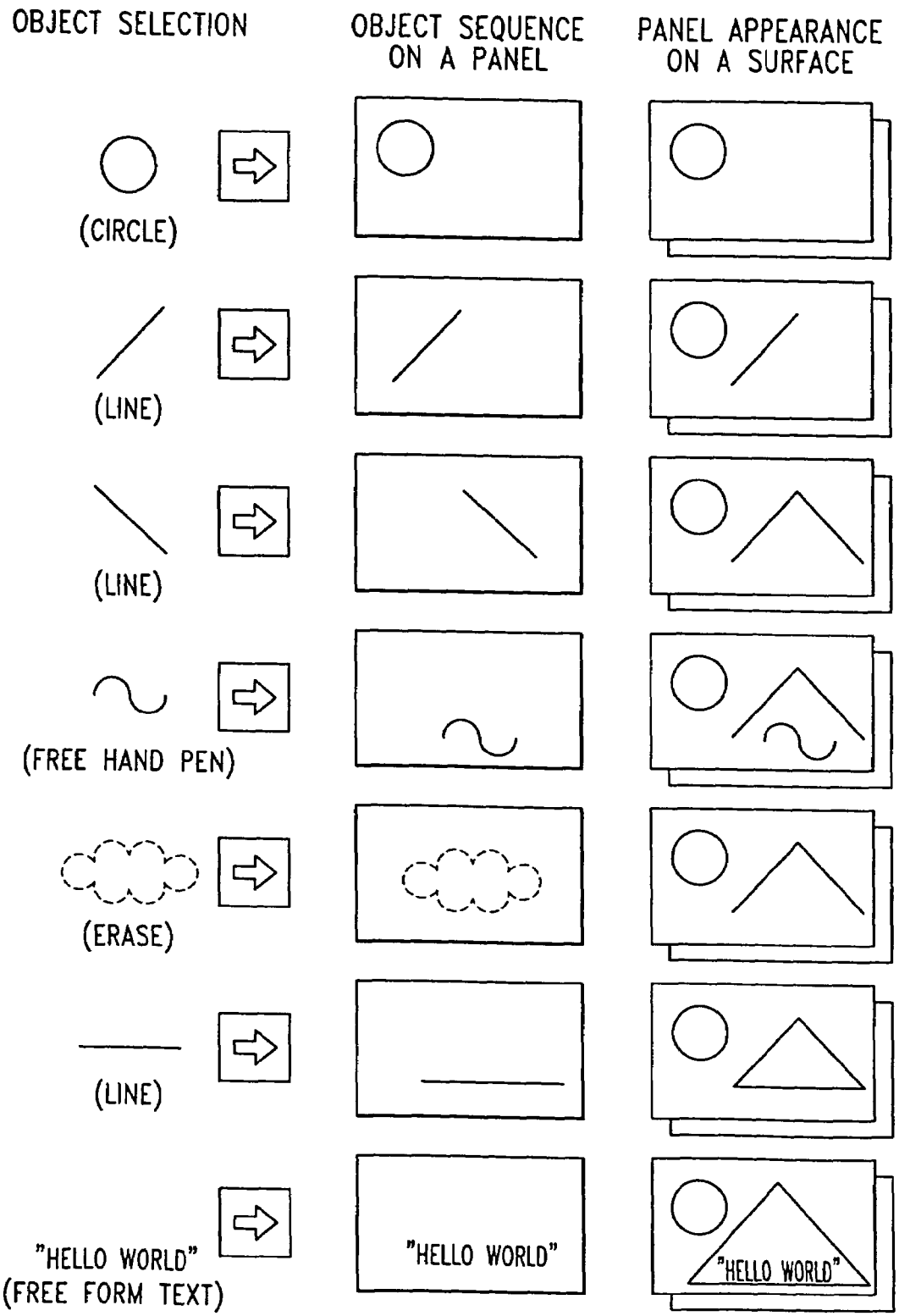
FIG. 7 is an illustration of the evolution of an image created by adding image objects to a panel of the preferred embodiment.

Preferably, each step in the evolution of the group work area 300 is stored in the notebook file, so that the users can review the group discussion by watching as each new image is added, or as an existing image is altered. FIG. 7 illustrates the evolution of a complex image on a surface, as it is constructed from a set of simpler images. The simplest images that can be placed on the group work area 300 are called objects. In the presently preferred embodiment, the available objects include free-form draw objects, defined shapes (such as lines, circles, rectangles, arrows, polygons, ellipses, perpendicular lines, answer boxes, etc.), typed text, and erasures. In certain embodiments, "erasure" objects actually just fill a region with the background color, so that images or portions of images are masked. They do not remove previously added objects from the data structure of the panels 650, or the group work area 300. Erasure objects employing a layered drawing surface are preferable, as described hereinbelow.

In the presently preferred embodiment, objects on the moderator's public scroll 610 are conveyed to participants' workstation in a dynamic fashion. The moderator's objects are typically conveyed only when the objects are complete. So, for example, while the moderator is creating a draw object, the participants do not see the progress of developing the draw object on their display. After a pointer creates the draw object and the pointer is no longer focused on the object, the object is then conveyed to all participants, and added to their public scroll 620.

The presently preferred embodiment employs the structure of panels 650 as a linked-list to capture and replay the creation of objects for both moderator and participants. The system captures information to a scroll panel 650 in a sequence of individual objects as they are applied to the scroll panel 650. The objects are part of the panel 650 and are not stored as separate files. The creation sequence of objects on a scroll panel 650 may be replayed to show the sequence in an object-by-object fashion. There is no "capture" activation required by a user since the placement of objects on the panel 650 is a native function. Thus, in the preferred embodiment, there is no need for the moderator or a participant to recognize in advance that the evolution of an image may be useful, in order to activate a capture function (i.e. a "record" function). Since the objects are embedded in a panel 650 the replay feature is natively available when panel files 650, panel messages, or notebook files are communicated.

Thus, it will be appreciated that in addition to storing images corresponding to information discussed by the group on the series of panels 650 of the group work area 300 in a pattern indicative of the order in which it was discussed, such as, for example, placing them from top to bottom on the work area as they are created (or from left to right on a horizontally scrolling surface), sets of related images can also be stored on the work surface within a single panel 650, as a series of modifications to a previous image. In this way, the notebook file can store evolution in an image that took place during the session.

For example, in a discussion about architecture, the moderator might start by showing a basic floor plan that will serve as a starting point for a number of points during the discussion. In addition to simply drawing that basic floor plan during the discussion, it might have been drawn by the moderator before the group discussion (for example, by using the system in standalone mode), or it might have been imported as a digital image (such as from a jpeg file)—for example by being downloaded from the internet—or it might have been optically scanned in by the moderator. During the discussion, the moderator could alter the floor plan in order to show the solution to some design problem. If this solution introduced some new design problem, the moderator might then alter this new floor plan. In this way, the floor plan might go through several iterations. Rather than placing a new image on a new location on the shared work surface 300, these images could be stored as alterations in the previous image. Thus, when a user later reviewed the discussion, the basic floor plan could be shown first, and then be again replaced by each iteration of that basic design that was included by the moderator during the discussion. Note that in the preferred embodiment, the later review can be done during the ongoing session, as discussed further herein, with respect to session synchronization.

In the preferred embodiment, in which the moderator work area 310 and participant work areas 320 are implemented as a public scroll and a private scroll, these alterations are stored as additional objects in series on the panel 650, including, for example, erase objects and new draw objects.

Another example of how a set of related images might be advantageously placed in the same apparent location of the group work area 300 is animation. For example, in a discussion of a rotary combustion engine, a series of images illustrating the movement of the parts, shown in a continuous closed loop, could be included, as a means of graphically illustrating the engine cycle. Such animations could be stored as a looped series of objects, such as bit maps. In certain embodiments, such animations could be stored as an animation object.

Another way in which related images might be placed in the same apparent location of the group work area 300 is by hyperlinking. For example, web content could be placed directly on the group work area 300. When the area 300 is viewed, the web content (such as a particular web page, or a part of a particular web page) would be seen. If the web page were changed, when the work area 300 is subsequently viewed the altered version of the web page would automatically be viewed. This might be advantageously employed, for example, to display changing class data, such as class rankings. Alternatively, it might be useful to display other changing data of relevance to the group's subject matter, such as experimental data that is being accumulated over a period of time.

The presently preferred embodiment includes means to synchronize a workstation with an ongoing session. For example, a participant may be late for the start of the discussion, or may be interrupted during a session. The presently preferred embodiment includes two methods for synchronization: session synchronization and scroll panel synchronization.

In the preferred embodiment, session synchronization transmits all moderator objects from the beginning of the session up to the most recent object entered by the moderator to the moderator public scroll 610. In situations where a participant was late joining a session, session synchronization allows the participant to obtain all panels from the beginning of the session. It then positions the participant's public scroll to same location as the moderator's scroll panel.

Scroll panel synchronization allows participants that start a session with the moderator to catch up while in a session. This feature is enabled by a continuous and automatic synchronization process that occurs without moderator or participant intervention. This frees the participant to not track their public scroll 620 to the moderator's public scroll 610—that is, when the participant can display a previous panel 650 or replay the linked-list comprising the present panel 650. For example, the participant can also review a prior panel 650 to add local annotations which might not have occurred to them before. During this time the moderator may continue to present new panels 650 during the session. Scroll panel synchronization repositions the participant's public scroll 620 so it is at the same location as the moderator's public scroll 610. It also ensures that all panels from the moderator's public scroll 610 are available to the participant during the period the participant's public scroll 620 was not synchronized with the moderator's public scroll 610.

In the presently preferred embodiment, the moderator workstation includes functionality for an assessment mode. Certain alternative embodiment systems include this functionality elsewhere in the system. Regardless of where the assessment mode functionality is implemented, panel files 650 can include checkpoint objects. Checkpoint objects need not have any graphic representation, though in certain embodiments they do. The checkpoint object serves as a flag in the linked-list of a panel file 650. When placed in assessment mode, replay of a panel 650 either begins or ends with the selected checkpoint.

For example, in certain embodiments, checkpoint objects can be used by the moderator to mark the end of a time limit during the discussion. For example, if a teacher wished to use the assessment mode to present and review a question to the participating students, the question might be created on a panel with 25 objects (free hand draw objects, typed text objects, shapes, etc.). A participant might begin to write an answer composed of 50 objects or so. During the process of preparing this answer, the participant might realize that their approach to the answer is incorrect, and select an erase object to cover over part of their answer. The participant then could continue to add objects to complete the answer. At some point, the teacher will want to explain the correct answer. The moderator can use the assessment mode to place a checkpoint object on each participant's public scroll 620 (by placing it on the moderator's public scroll 610), and then begin to explain the correct answer. At this point, if a participant realizes their answer is again mistaken, they can again erase (i.e. cover over) the errors and add images demonstrating the correct answer. The participant can view the corrected answer normally. However, when the teacher pulls the panel 650 and replays it to review the student's performance, the replay will stop at the checkpoint, so that the teacher knows that subsequent objects were added after the teacher began to explain the correct answer.

Note that the teacher need not pull the relevant panel 650 to review an answer. For example, the teacher could open a student's notebook file in standalone mode instead.

In certain embodiments, another type of checkpoint object can be inserted by the participant, in order to mark where the teacher should begin reviewing. For example, in the example above, the student could insert such a checkpoint object after the first erase object. When the teacher pulls and reviews that panel in assessment mode, the display would begin at that point, already displaying each of the previous objects (including the erase object), and begin adding the subsequent objects to the display one at a time. In this way, the teacher need not spend time reviewing work which the student has already recognized was in error. Note that the teacher may preferably still review the earlier work, either by overriding the student's checkpoint, or by reviewing the panel outside of assessment mode.

In the presently preferred embodiment, the moderator workstation can only pull images from a participant's public scroll 620 or private scroll 622 if the participant decides to permit it. This decision may be implemented by means of a software flag, for example. This assures the participants that they can make annotations privately. It is believed that this guarantee of privacy places the participants more at ease, and therefore more able to experiment or brainstorm. Certain alternative embodiments lack this feature. Certain other alternative embodiments can implement sessions either including or excluding this feature, at the option of the moderator. In these last embodiments, preferably some visual cue, such as an icon or a background color, is included in the participant's displays, so that they can readily identify whether the session permits such private annotations.

In certain embodiments, the moderator workstations and participant workstations are determined completely by software functionality. In these embodiments, more than one of the user's workstation can become the moderator workstation. For example, the moderator workstation could be selected by passing a security token from the moderator workstation to a participant workstation, thereby causing their roles to reverse. Alternatively, moderator functionality could be added to participant workstations, thereby allowing, for example, a participant to add images to the moderator work area 310. These embodiments could advantageously be used to facilitate the transfer of information between members of a group in environments where the transfer is not necessarily expected to flow primarily from one user to the others. For example, such embodiments could advantageously be used to facilitate information transfer in a remote conference of employees of one or more businesses. Note that it is not necessary in these embodiments for every workstation to have the same devices. For example, one workstation could be a preferred moderator workstation, having a plurality of display devices (for example, one for displaying the shared work area 330 and one for displaying the moderator private work area 340*a*), while the other workstations could be preferred participant workstations, having only a single display device each. Despite this limitation, the group work area could advantageously permit any of the participant work stations to become the moderator work station. Such embodiments could advantageously be used, for example, in classroom settings, where the transfer of information is generally expected to predominantly flow from a designated moderator (the teacher), in order to facilitate situations in which a participant turns out to have a significant amount of information to convey to the other users. For example, in a class focused on architecture, the teacher might be especially interested in the perceptions of a foreign student about some aspect of foreign or domestic architecture. In that situation, the moderator could advantageously make the participant's workstation the moderator's workstation, so that the foreign student can augment his or her comments with images that are placed directly on each of the other user's public work areas.

Figure 10A:
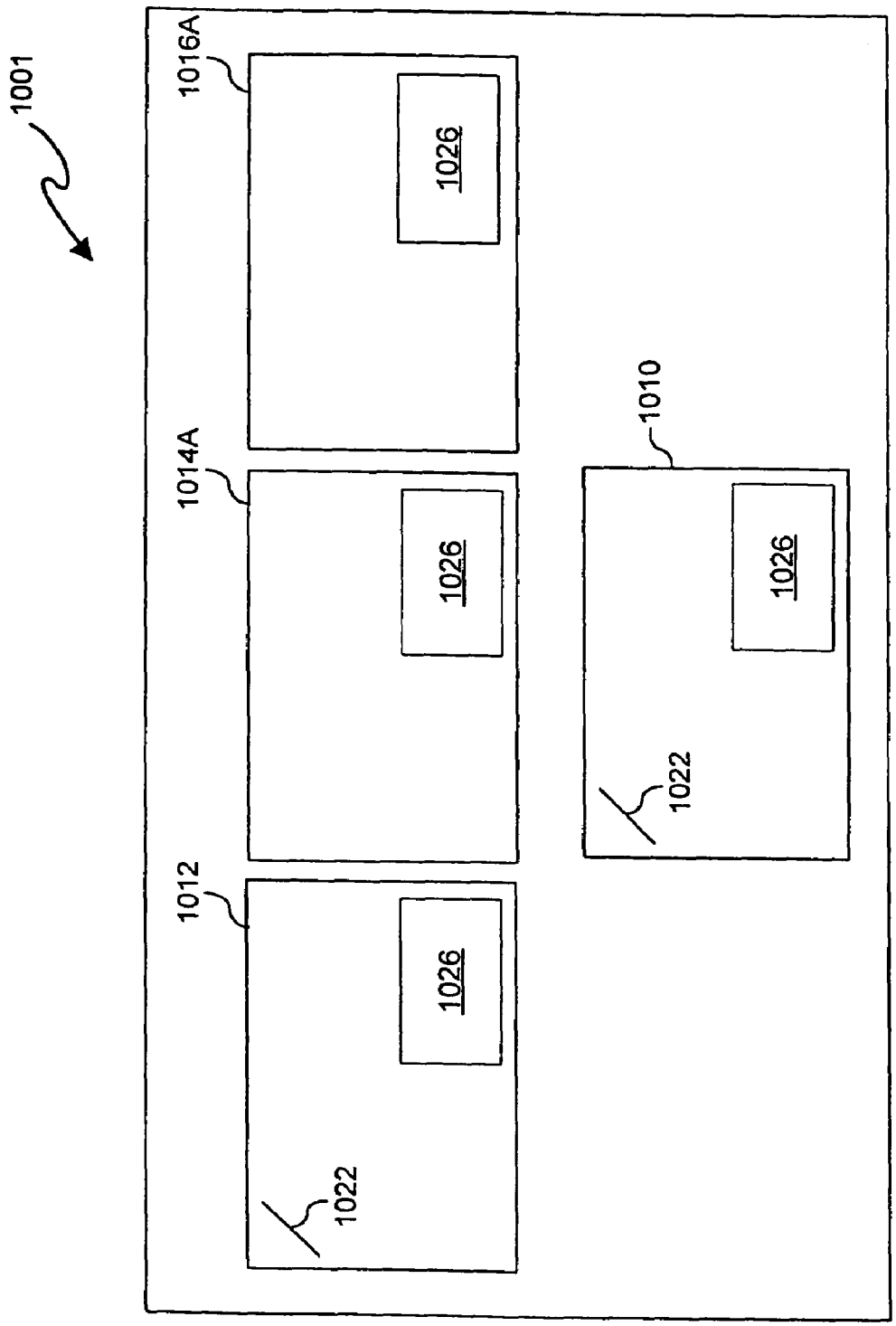
FIGS. 10A and 10B are schematic diagrams of certain elements of a virtual drawing surface suitable for use with a system according to the present invention.
Figure 10B:
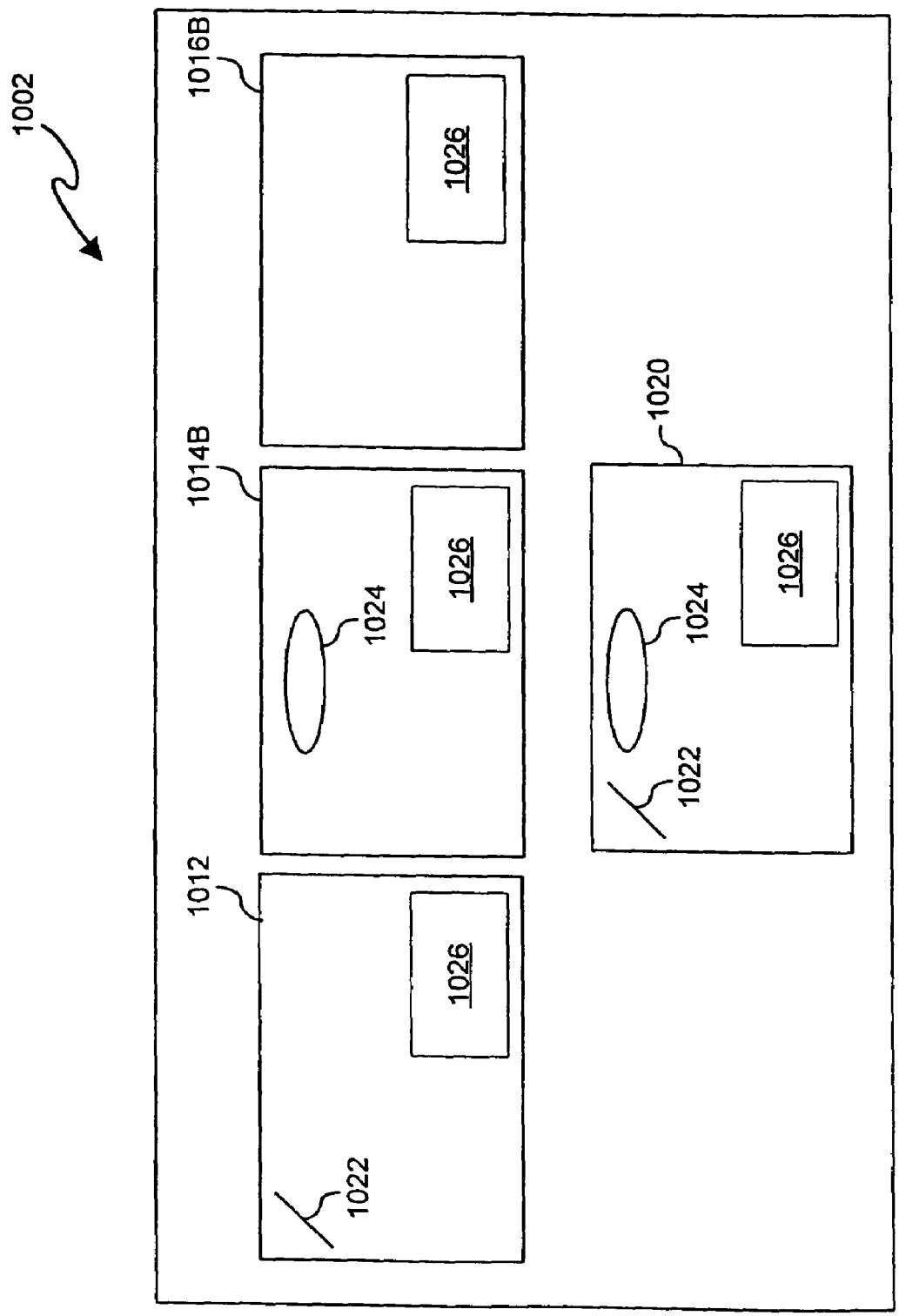

In certain alternative embodiments of the present invention the public scroll and private scrolls are implemented using the following layered drawing surface paradigm, illustrated in FIGS. 10A and 10B. As is described in detail hereinbelow, the layered drawing surface of the preferred embodiment provides for an advantageous mechanism to erase objects and annotations without disturbing important objects on the panel.

FIGS. 10A and 10B show a moderator workstation 1001 and a participant workstation 1002, each having within them a number of drawing layers. Each user has displayed at their workstation a "main layer," which comprises a composite of three other layers, superimposed. The main layer is the image actually displayed, whereas the layers from which the main layers are composed are logical (and data) constructs that regulate how different objects on the shared work surface are treated in response to session events, such as erasing.

FIGS. 10A and 10B show both the moderator's main layer 1010 and a participant's main layer 1020. Typically, when a moderator places an object on the shared work surface, it is added to the moderator's layer 1012, as illustrated in FIGS. 10A and 10B with the line-object 1022. It will be appreciated by those skilled in the art that, during the process of creating even relatively simple drawing objects a number of iterations may be necessary. For example, the process of creating many simple drawing objects involves a process called "rubber banding," in which the size and shape of the object are adjusted until the desired final product is reached. In the preferred embodiment, this process is performed on the main layer; only after the moderator has finalized the new object is it then copied to the moderator layer 1012, as illustrated by the line object 1022 in FIG. 10A. Furthermore, because by default the participant main layer 1020 is the composite of the moderator layer 1012, the participant layer 1014B, and the background layer 1016B, when the object is finalized the participant main layers 1020 are also updated to include the line-object 1022.

In contrast, when a new object is finalized at a participant workstation 1002 it is copied to the participant layer 1014B, as shown by the oval object 1024 in FIG. 10B. A participant layer 10141B is not by default shared in common by the workstations—each workstation has it's own participant layer 1014. (In FIG. 10A, the moderator's participant layer is indicated at 1014A. In the preferred embodiment, the moderator has its own, unique participant layer, which the moderator can chose to view the participant layer 1014B from any of the user's workstations 1002, as described hereinabove, causing it to be displayed at his workstation 1001.) Thus, as shown in FIG. 10A, the oval-object 1024 is not by default added to the moderator's participant layer 1014A, and is not displayed on the moderator main layer 1010. It will be appreciated, therefore, that the panels 650 are comprised of the moderator layer 1012, the participant layer 1014, and the background layer 1016. The main layers 1010 and 1020 comprise these layers, plus potentially objects that are still being constructed.

In the preferred embodiment objects that are deemed more important can be made permanent by adding them to the background layer 1016. This may be done, for example, by an instruction from the moderator to make the object permanent. For example, if a moderator is using the system to teach a music theory class, he might place a musical staff as a permanent object, upon which musical notes could be added and erased to illustrate different chord structures, etc. Similarly, if the moderator is teaching a math class he might place the axes of a graph on the background layer 1016, so that different ordered pairs and curves can be added and erased without disturbing the axes.

In certain embodiments, only the moderator can make objects permanent by placing them on the background layer 1016. However, In the preferred embodiment, the moderator workstation comprises a moderator background layer 1016A, and the participant work stations 1002 comprise a participant background layer 1016B. In this embodiment, participants can also make objects permanent, by placing them on their participant background layer 1016B. In these embodiments, when the moderator places something on the background layer 1016A it is copied to each of the participant background layers 10161B. In contrast, when a participant places an object on their participant background layer 1016B, it is not copied to any other background layer 1016 (either moderator or participant).

In certain embodiments, certain classes of objects may have different default treatments. For example, in certain applications graphics objects might be anticipated to be the centerpiece of most panels in which they appear. For example, if the system is being used to teach a biology class, graphical images of tissue structures might be the primary purpose of the panels on which they appear, with drawing objects (such as line-objects, oval-objects, etc.) being used primarily to annotate and further explain and describe what is shown in the graphical image. In such applications, graphical images might by default be placed on the background layer 1016 when added to the shared work surface by the moderator. Preferably, by default, objects placed on the background layer 1016 by the moderator are also added to the participant layer 1014A and the moderator layer 1012.

Figure 11A:
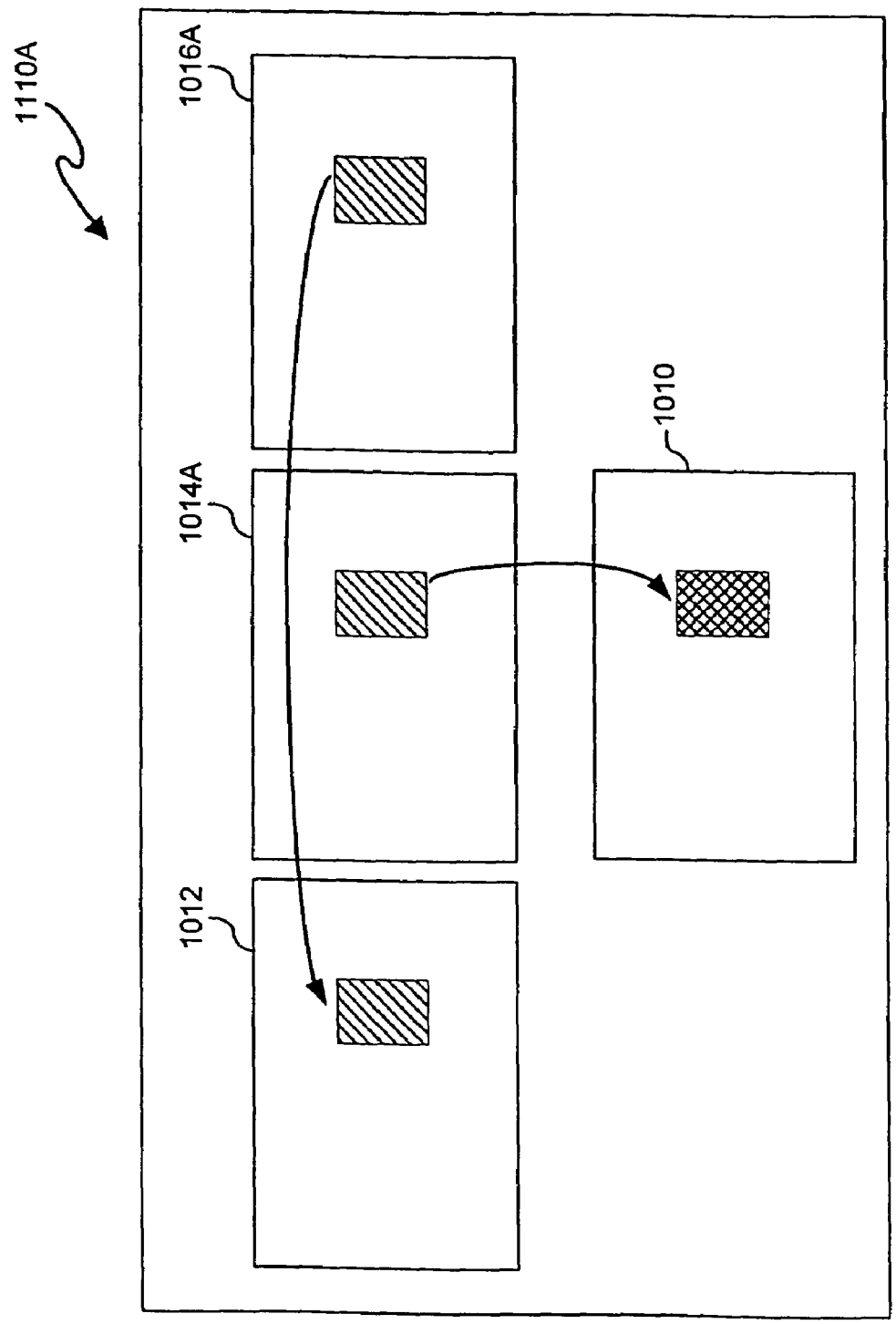
FIGS. 11A and 11B are illustrations of the behavior of erase objects suitable for use with a system according to the present invention.
Figure 11B:
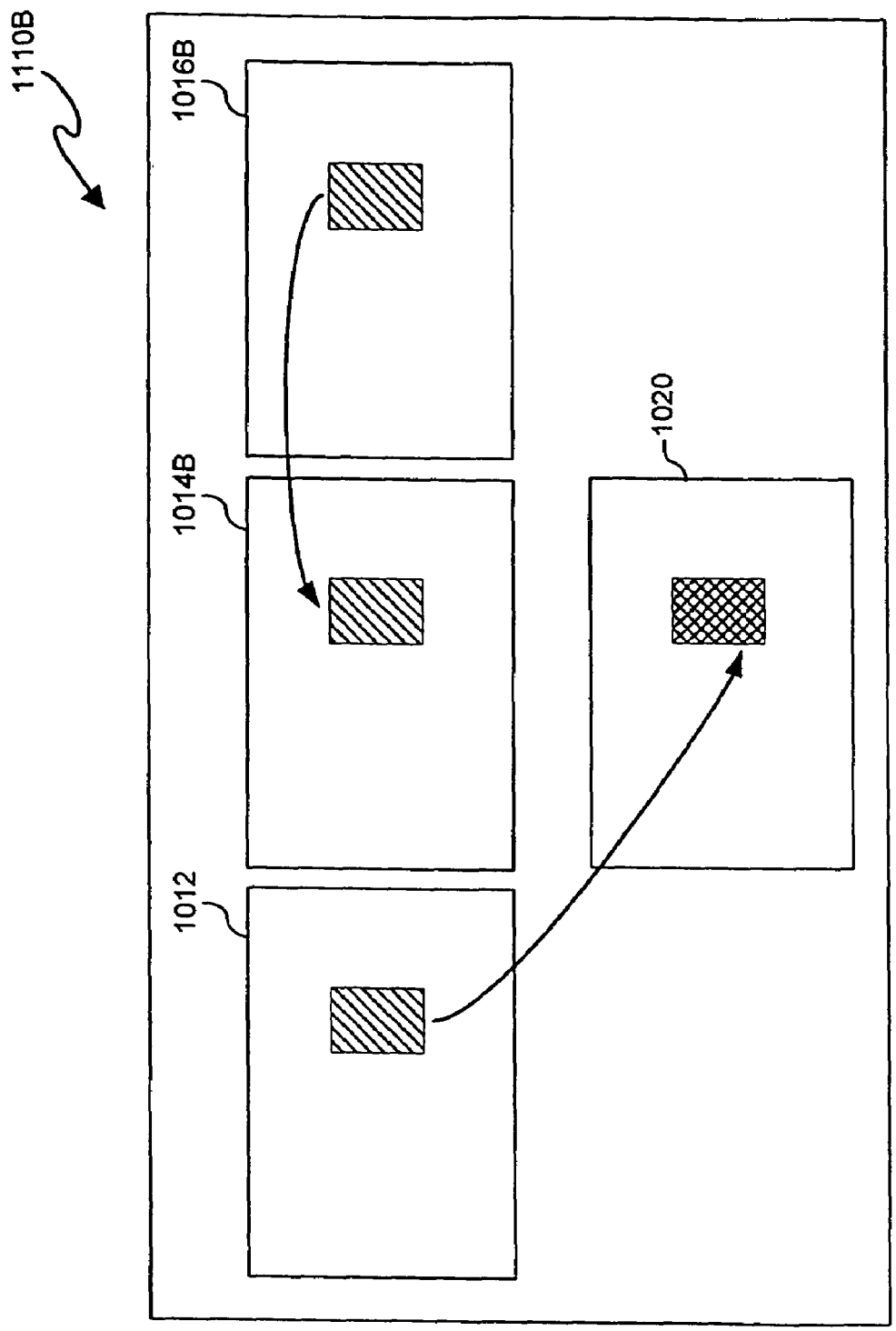

Regardless of the means chosen for making objects permanent, the layered drawing surface illustrated in FIGS. 10A and 10B provides an advantageous mechanism for erasing objects and annotations during the course of a session without erasing the permanent objects, illustrated in FIGS. 11A and 11B; FIG. 11A illustrates the behavior of an erase object used by a moderator 1110A, while 11B illustrates the behavior of an erase object used by a participant 1110B. In each case, the erase object is drawn upon the main layer 1010 or 1020 to identify the area to be erased.

In the case of the moderator's erase object 1110A, the portion of the participant layer 1014A corresponding to the area covered by the erase object 1110A is copied to the portion of the main layer 1010 covered by the erase object 110A, and the portion of the moderator's surface 1012 corresponding to the area covered by the erase object 1110A is replaced with the corresponding portion of the background layer 1016A. It will be appreciated that, because permanent objects are placed on both the background layer 1016 and the moderator's layer 1012, while temporary objects are placed only on the moderator's layer 1012, the effect of this replacement is to remove any temporary objects from corresponding portion of the moderator's' layer 1012, while leaving permanent objects undisturbed. Likewise, because permanent objects are placed on the participant layer 1014A, but temporary objects created at the moderator workstation 1001 are placed on the moderator layer 1012, the copying from the participant layer 1014A to the main layer 1010 removes temporary objects from the main layer 1010 without disturbing permanent objects.

In the case of a participant's erase object 1110B, the portion of the background layer 1016B corresponding to the erase object 1110B is copied to the participant's layer 1014, and the portion of the moderator layer 1012 corresponding to the erase object 1110B is copied to the main layer 1020. Because objects created at a participant workstation 1002 are placed on the participant layer 1014B, and not the moderator layer 1012, while permanent objects are placed on both, these two copying operations remove all temporary objects from the participant layer 1014B and main layer 1020, while leaving permanent objects undisturbed.

As previously discussed, one means of collision avoidance is to include an area on the drawing surface that is accessible only to the participants. Thus, in certain embodiments the participant layer 1014 is larger than the moderator layer 1012 and background layer 1016, so as to include a margin that does not overlap with them. Likewise, it will be apparent to those skilled in the art that the other means of collision avoidance and correction may be implemented with the layered drawing surface of the presently preferred embodiment.

It will be appreciated that a work area 310 or 320 comprising a layered drawing surface can employ the stacking of objects as described hereinabove with respect to FIGS. 6 and 7. For example, because the main layer 1020 comprises a composite of the moderator layer 1012 and the participant layer 1014B, the main layer will include the stack of objects generated in real time by the moderator and the participant. Similarly, in those embodiments in which participants can place objects on a participant background layer 1016B, the participant background layer 1016B will include the stack of permanent objects generated in real time by the moderator and the participant. Thus, a system according to the present invention comprising a main layer provides a layered drawing system in which at least one layer is a composite of real-time input from a plurality of users.

While in certain embodiments objects and other session events are saved in files that record the progress of the session, in the presently preferred embodiment a database is used to store objects and session events, as is known in the art. It will be appreciated that, conceptually, a database is simply a definitive repository for storing the desired objects and session events. Thus, session events need only be sent to and retrieved from the database, and the requisite functionality required to control the transfer of information among the distributed repositories at the respective workstations 310 and 320 is simplified. It will be appreciated, however, that use of a database architecture can provide a number of practical advantages, such as scalability.

The use of a database facilitates the use of additional types of objects and session events, including audio and video recording. As previously discussed, many of the annotations employed by users are used in order to help the participants recall what the moderator said. Clearly, being able to actually play back the moderator's verbal and non-verbal discussion is a valuable aid to the transfer of knowledge. Consequently, in certain embodiments the system includes audio or video recording devices, or both. It will be appreciated that audio and video recording ability also facilitates use of a system according to the present invention in remote learning situations (regardless of whether some, none, or all of the participants are remotely located).

Preferably, in these embodiments the audio and video recordings are stored as session events that are associated with the placement of objects and other session events according to the point in time when they were made. When the session is reviewed in standalone mode two ways of stepping through the material are preferably available: real time, and stepwise. In real-time mode, an audio or video segment is simply played back in real time, and objects or other session events that were placed on the scrolls during the period when the audio or video were recorded are replayed at the appropriate points during the recording. In step-wise mode, the user can step through the session events as described above (for example by clicking an "advance" command button), and whatever audio or video recording was made at the point in time when that session event occurred is automatically played back.

For example if the moderator is describing binary search trees, as discussed above, using a system including an audio or video recording, the placement of each object would be recorded with a time stamp that indicated when it was placed. In standalone mode a participant could then review the lecture in either real-time or stepwise mode. In real-time mode, the participant would see the video recording and hear the audio uninterrupted (barring instructions from the user otherwise). At the point in the lecture when the moderator placed the circle labeled "3" (as shown in FIG. 1) on the scroll, it would be displayed on the user's playback. At the point where the participant added the annotation "root" (as shown in FIG. 2), that, too, would appear on the playback. In stepwise mode, when the user advanced the scroll to the event in which the circle labeled "3" was added, the corresponding audio or video recording would begin playing. If the participant advanced to the next event before the audio or video recording had reached that point, the playback would jump ahead to the corresponding point in the recording. Conversely, if the audio or video recording reaches the point of the next session event, it would pause, waiting for further instructions from the user.

Figure 9:
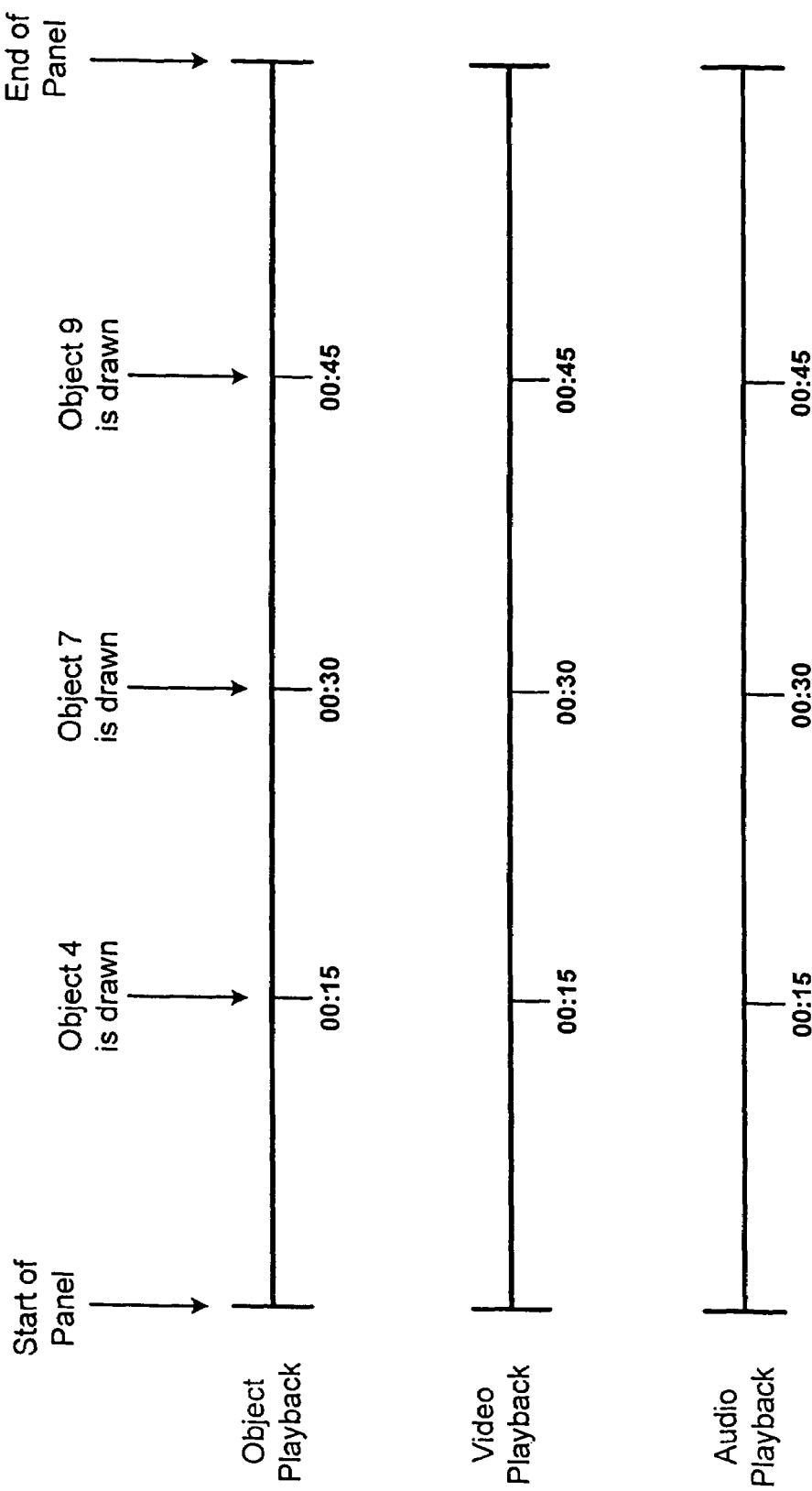
FIG. 9 is an illustration of synchronization of the object, video, and audio playback elements of a knowledge transfer session created with a knowledge transfer system according to the present invention.

An example of synchronized playback is schematically illustrated in FIG. 9. At time zero a session event occurs beginning a new panel. While the moderator is speaking, to the group, he is adding objects to the scroll. Fifteen seconds after starting the panel, he places the fourth object on the panel. During the following fifteen seconds he places three more objects on the panel. In the following 15 seconds he places two more objects on the panel. One minute after starting the panel, the moderator closes the panel (perhaps to begin the next one). In real-time playback, the one-minute audio and video recordings would play back together, with the objects appearing at the indicated points in time. In stepwise playback, at each instruction to advance one object the audio and video recordings would begin playing back at the corresponding points in time.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A client/server network of computers programmed for knowledge transfer in a group setting, the client/server network comprising:

at least one server containing a database; and a plurality of clients including participant workstations and at least one moderator workstation, each participant workstation programmed to provide a participant work area and having at least one corresponding participant input-device, and each of the participant input-devices being adapted to create data structures defining participant images that are then included in the participant work area, each participant workstation being programmed to send data structures defining participant images to the database on the at least one server and to retrieve moderator images from the database and include them in the participant work area;

each moderator workstation programmed to provide a moderator work area and comprising at least one moderator input-device, the at least one moderator input-device being adapted to create data structures defining moderator images that are then included on the moderator work area, the moderator workstation programmed to send the data structures defining the moderator images to the database on the at least one server, wherein the data structures are stored in the database, and to retrieve participant images from the database from any selected one of the plurality of participant work areas and include the selected participant images on the moderator work area, wherein the moderator workstation is adapted to transmit an object drawn by the moderator when the object is complete.

2. The network of claim 1, wherein the moderator work area comprises a main layer, a moderator layer, a first participant layer, and a background layer.

3. The network of claim 2, wherein each participant's work station displays a participant's main layer, the participant's main layer being a composite of the moderator layer, the background layer, a second participant layer.

4. The network of claim 1, wherein the network can be used in a group mode and a standalone mode.

5. The network of claim 1, wherein the workstations are located such that a first user positioned to use a workstation and a second user positioned to use a different workstation can hear each other speak.

6. The network of claim 5, wherein every user positioned to use a workstation can hear every other user positioned to use any other workstation.

7. The network of claim 1, wherein no user positioned to use a workstation can hear any other user positioned to use a different workstation.

8. The network of claim 1, wherein images are organized in notebook data structures comprising at least one panel.

9. The network of claim 8, wherein the images are stored as at least one object in a single panel.

10. The network of claim 1, wherein images placed on a participant's work area at a participant workstation may be viewed only at that workstation unless an instruction to permit the images to be viewed from another workstation is given at the participant workstation providing the participant's work area.

11. The network of claim 10, wherein the instruction to permit the images to be viewed from another workstation actively causes data structures corresponding to the images to be transmitted to another workstation.

12. The network of claim 1, further comprising collision-correction functionality.

13. The network of claim 12, wherein the collision-correction functionality comprises functionality permitting toggling between a plurality of view modes.

14. The network of claim 12, wherein the collision-correction functionality comprises functionality permitting relocation of images on the participant work area.

15. The network of claim 14, wherein the relocation of images occurs automatically when a collision occurs.

16. The network of claim 1, further comprising collision-avoidance functionality.

17. The network of claim 16, wherein the collision-avoidance functionality comprises a margin that does not have a corresponding location of the shared work area.

18. The network of claim 16, wherein the collision-avoidance functionality comprises functionality that permits the participant to place footnote images on the participant work area that provide a link between the footnote images and corresponding images placed on a portion of the participant work area that is not superimposed on the shared work area.

19. The network of claim 16, wherein the collision-avoidance functionality comprises functionality that permits the participant to place footnote images in the participant public work area, the footnote images providing a link to corresponding images located elsewhere.

20. The network of claim 19, wherein the participant work area comprises a virtual drawing surface, the virtual drawing surface comprising a main layer, a moderator layer, a background layer, and a participant layer having a margin that does not overlap with either of the moderator layer and the background layer, wherein the corresponding images are placed on the margin on the participant layer.

21. A network of computers programmed for knowledge transfer in a group setting, the network comprising:

at least one server containing a database;

a plurality of participant workstations, each programmed to provide a participant work area and having at least one corresponding participant input-device, each of the participant input-devices being adapted to create data structures defining participant images that are then included on the participant work area;

a moderator workstation, programmed to provide a moderator work area and comprising at least one moderator input-device, the at least one moderator input-device being adapted to:

create data structures defining moderator images that are then included on the moderator work area, and select moderator images that are then simultaneously included on each of the plurality of participant work areas; and collision-avoidance functionality that permits a participant to place footnote images on the participant work area that provide a link between the footnote images and corresponding images located elsewhere;

wherein the data structures are stored in the database;

wherein the moderator work area comprises a main layer, a moderator layer, a participant layer, and a background layer;

wherein each participant work area comprises:

a main layer;

a participant layer;

a moderator layer common to the moderator work area; and a background layer common to the moderator work area;

wherein the moderator input-device is further adapted to select participant layers from any of the plurality of participant work areas that are then copied to the participant layer on the moderator's virtual drawing surface; and wherein a participant layer may only be selected to be copied to the participant layer on the moderator's virtual drawing surface after an instruction has been given at the participant workstation upon which the participant layer resides.

22. The network of claim 21, further comprising collision-correction functionality permitting toggling between a plurality of view modes.

23. The network of claim 22, wherein the plurality of view modes includes at least one member from the set consisting of:
 a) a mode in which the moderator layer is displayed;
 b) a mode in which the background layer is displayed;
 c) a mode in which the participant layer is displayed.

24. The network of claim 21, further comprising collision-correction functionality permitting relocation of images on the participant work area.

25. The network of claim 24, wherein the relocation of images occurs automatically when a collision occurs.

26. The network of claim 21, wherein the collision-avoidance functionality comprises a margin in the participant layer that does not overlap with either the moderator layer or the background layer.

27. A client/server method of facilitating knowledge transfer in a group setting, comprising:
 providing at least one server containing a database;
 connecting the at least one server to a plurality of clients including participant workstations and at least one moderator workstation, each participant workstation comprising:
  at least one participant display device;
  at least one participant input device; and
  a participant virtual drawing surface,
  the at least one participant input device being adapted to permit the participant to create data structures defining images on the participant virtual drawing surface that are displayed on the at least one participant display device;
 each moderator workstation comprising:
  at least one moderator display device;
  at least one moderator input-device; and
  a moderator virtual drawing surface,
  the at least one moderator input device being adapted to create data structures defining images on the moderator virtual drawing surface that are displayed on the at least one moderator display device and on each of the participant display devices;
 sending data structures from the moderator workstation to the database on the at least one server and therefrom to the participant workstations for display on the participant display devices; and
 sending data structures from participant workstations to the database on the at least one server and therefrom to the moderator workstation;
 wherein each moderator workstation is adapted to transmit an object drawn by the moderator when the object is complete.

28. The method of claim 27, wherein the moderator input-device is further adapted to select images on any of the plurality of participant virtual drawing surfaces that are then copied to the moderator virtual drawing surface.

29. The method of claim 28, further comprising the step of making a recording with at least one member of the set consisting of a video recording device and an audio recording device.

30. The method of claim 28, wherein a session can be replayed on the moderator display device and on each of the at least one participant display devices by adding images corresponding to the data structures to a composite image in the order the data structures were created.

31. The method of claim 30, further comprising the step of making a recording with at least one member of the set consisting of a video recording device and an audio recording device.

32. The method of claim 31, wherein the images corresponding to the data structures can be added to the composite image one at a time in response to an instruction.

33. The method of claim 31,
 wherein a recording is played back with at least one member of the set consisting of a video playback device and an audio playback device; and
 wherein a recording can be played back on the member of the set in synchronization with the data structures, such that the images corresponding to the data structures are added to the composite image at points in time corresponding to the points in the recording where the data structures were created.

34. An interactive learning method facilitating multiple synchronous class sessions, comprising:
 providing a client/server architecture including at least one server containing a database;
 connecting the at least one server to a plurality of student workstations and an associated teacher workstation in each of a plurality of classes, each student workstation comprising:
  at least one student display device;
  at least one student input device; and
  a student virtual drawing surface,
  the at least one student input device being adapted to permit the student to create data structures defining images on the student virtual drawing surface that are displayed on the at least one student display device;
 each teacher workstation comprising:
  at least one teacher display device;
  at least one teacher input-device; and
  a teacher virtual drawing surface,
  the at least one teacher input device being adapted to create data structures defining images on the teacher virtual drawing surface that are displayed on the at least one teacher display device;
 sending data structures from the teacher workstation in each class to the database on the at least one server and therefrom to the student workstations in the respective classes for display on the student display devices; and
 sending data structures from student workstations in each class to the database on the at least one server and therefrom to the respective teacher workstations;
 wherein each teacher workstation is adapted to transmit an object drawn by the teacher when the object is complete.

35. The method of claim 34, wherein each virtual drawing surface comprises a teacher layer, a student input layer, and a background layer containing at least one object.

36. The client/server network of claim 1, wherein the plurality of clients includes student workstations and an associated teacher workstation in each of a plurality of classrooms, each workstation connected to the at least one server, whereby multiple classroom sessions may be conducted simultaneously via the server.

37. The client/server network of claim 1, wherein said participant workstations include moderator functionality allowing the participants to add images to the moderator work area, whereby multiple users may concurrently serve as moderators making changes to the content of the moderator work area.

38. The client/server network of claim 1, wherein each participant workstation is programmed to synchronize with an ongoing session by retrieving from the database all moderator images created during the session before the participant joined the session.

39. The interactive learning method of claim 34, wherein the student, workstations include moderator functionality allowing the students to add images to the teacher virtual drawing surface, whereby multiple users may concurrently serve as moderators making changes to the content of the teacher virtual drawing surface.

40. The interactive learning method of claim 34, wherein each student workstation is programmed to synchronize with an ongoing session by retrieving from the database all images created by the teacher during the session before the student joined the session.

41. A client/server network of computers programmed for knowledge transfer in a group setting, the client/server network comprising:
   at least one server containing a database;
   a plurality of clients including participant workstations and at least one moderator workstation,
      each participant workstation programmed to provide a participant work area and having at least one corresponding participant input-device, and each of the participant input-devices being adapted to create data structures defining participant images that are then included in the participant work area, each participant workstation being programmed to send data structures defining participant images to the database on the at least one server and to retrieve moderator images from the database and include them in the participant work area;
      each moderator workstation programmed to provide a moderator work area and comprising at least one moderator input-device, the at least one moderator input-device being adapted to create data structures defining moderator images that are then included on the moderator work area, the moderator workstation programmed to send the data structures defining the moderator images to the database on the at least one server, wherein the data structures are stored in the database, and to retrieve participant images from the database from any selected one of the plurality of participant work areas and include the selected participant images on the moderator work area; and
      collision-avoidance functionality permitting a participant to place a first image in the moderator work area visible to the moderator, the first image having a corresponding image in the participant work area that is not visible to the moderator.

42. A client/server method of facilitating knowledge transfer in a group setting, comprising:
   providing at least one server containing a database;
   connecting the at least one server to a plurality of clients including participant workstations and at least one moderator workstation, each participant workstation comprising:
      at least one participant display device;
      at least one participant input device; and
      a participant virtual drawing surface,
      the at least one participant input device being adapted to permit the participant to create data structures defining images on the participant virtual drawing surface that are displayed on the at least one participant display device;
   each moderator workstation comprising:
      at least one moderator display device;
      at least one moderator input-device; and
      a moderator virtual drawing surface, the at least one moderator input device being adapted to create data structures defining images on the moderator virtual drawing surface that are displayed on the at least one moderator display device and on each of the participant display devices;
   sending data structures from the moderator workstation to the database on the at least one server and therefrom to the participant workstations for display on the participant display devices; and
   sending data structures from participant workstations to the database on the at least one server and therefrom to the moderator workstation; and
   avoiding collisions by permitting a participant to place a first image on the moderator virtual drawing surface visible to the moderator, the first image having a corresponding image on the participant virtual drawing surface that is not visible to the moderator.

43. The method of claim 27, wherein the plurality of clients includes student workstations and an associated teacher workstation in each of a plurality of classrooms, each workstation connected to the at least one server, whereby multiple classroom sessions may be conducted simultaneously via the server.

44. The method of claim 27, wherein said participant workstations include moderator functionality allowing the participants to add images to the moderator virtual drawing surface, whereby multiple users may concurrently serve as moderators making changes to the content of the moderator virtual drawing surface.

45. The method of claim 27, wherein each participant workstation is programmed to synchronize with an ongoing session by retrieving from the database all moderator images created during the session before the participant joined the session.

* * * * *